United States Patent
Masuda et al.

(10) Patent No.: US 11,789,311 B2
(45) Date of Patent: Oct. 17, 2023

(54) ILLUMINATION DEVICE INCLUDING A FIRST AND A SECOND LIGHT REDUCTION PORTION AND A DISPLAY DEVICE INCLUDING THE SAME

(71) Applicant: Sharp Display Technology Corporation, Kameyama (JP)

(72) Inventors: Takeshi Masuda, Kameyama (JP); Hisashi Watanabe, Kameyama (JP); Hirotoshi Yasunaga, Kameyama (JP)

(73) Assignee: Sharp Display Technology Corporation, Kameyama (JP)

(*) Notice: Subject to any disclaimer, the term of this patent is extended or adjusted under 35 U.S.C. 154(b) by 0 days.

(21) Appl. No.: 17/690,553

(22) Filed: Mar. 9, 2022

(65) Prior Publication Data
US 2022/0308399 A1    Sep. 29, 2022

(30) Foreign Application Priority Data
Mar. 29, 2021 (JP) .................... 2021-055846

(51) Int. Cl.
*G02F 1/13357* (2006.01)
*F21V 8/00* (2006.01)
*G02F 1/1335* (2006.01)

(52) U.S. Cl.
CPC ..... *G02F 1/133606* (2013.01); *G02B 6/0055* (2013.01); *G02B 6/0088* (2013.01); *G02F 1/133601* (2021.01); *G02F 1/133603* (2013.01); *G02F 1/133614* (2021.01); *G02F 1/133615* (2013.01)

(58) Field of Classification Search
CPC ............ G02B 6/0055; G02F 1/133601; G02F 1/133606
See application file for complete search history.

(56) References Cited

U.S. PATENT DOCUMENTS

| | | | |
|---|---|---|---|
| 2011/0051397 A1* | 3/2011 | Bae | G02B 6/0021 362/235 |
| 2012/0218752 A1* | 8/2012 | Sumitani | G02F 1/133605 362/296.01 |
| 2018/0045384 A1* | 2/2018 | Uno | G02B 6/0043 |
| 2020/0064690 A1 | 2/2020 | Xu et al. | |
| 2021/0026203 A1* | 1/2021 | Kim | G02F 1/133606 |

\* cited by examiner

Primary Examiner — Keith G. Delahoussaye
(74) Attorney, Agent, or Firm — ScienBiziP, P.C.

(57) ABSTRACT

An illumination device includes a light source, a wavelength conversion sheet configured to perform wavelength conversion on light from the light source, and a first light reduction portion disposed in a frame shape as a whole overlapping an outer peripheral portion of the wavelength conversion sheet in a plan view between the light source and the wavelength conversion sheet, and configured to reduce a light amount of incident light.

20 Claims, 21 Drawing Sheets

ILLUMINATION DEVICE INCLUDING A FIRST AND A SECOND LIGHT REDUCTION PORTION AND A DISPLAY DEVICE INCLUDING THE SAME

CROSS-REFERENCE TO RELATED APPLICATIONS

This application claims the benefit of priority to Japanese Patent Application Number 2021-055846 filed on Mar. 29, 2021. The entire contents of the above-identified application are hereby incorporated by reference.

BACKGROUND

Technical Field

The present technique relates to an illumination device and a display device.

As an illumination device that irradiates a liquid crystal panel with light, a backlight device is typically known that includes a light source and a wavelength conversion sheet for converting a wavelength of light from the light source, and that emits light from the light source and light from the wavelength conversion sheet as combined white light. One example of the backlight device is disclosed in US 2020/0,064,690 A.

The backlight device described in US 2020/0,064,690 A is a so-called direct type, and includes a plurality of light-emitting elements (light sources) disposed on a bottom plate of a backplane (chassis) of the backlight device, and a reflective sheet disposed so as to cover the bottom plate and a side plate of the chassis from an inner face. Further, it is disclosed that an outer peripheral portion (frame portion) of the reflective sheet is subjected to application, printing, and the like of a wavelength conversion material that can convert emitted light from the light-emitting element into white light. According to such a configuration, before reaching the wavelength conversion sheet, a part of the emitted light from the light-emitting element is converted into the white light by the wavelength conversion material provided on the outer peripheral portion of the reflective sheet. As a result, a problem that color unevenness in irradiation light occurs in the outer peripheral portion of the backlight device (for example, the irradiation light is tinged with blue when the emitted light of the light-emitting element is blue) is suppressed.

SUMMARY

In US 2020/0,064,690 A, a quantum dot phosphor is exemplified as a specific example of a wavelength conversion material printed on a reflective sheet. However, the quantum dot phosphor easily degrades due to heat and humidity, and has a problem in reliability. Even when another phosphor is used as the wavelength conversion material, the same problem may occur. Furthermore, there is a circumstance where a cost increases regardless of a type of the wavelength conversion material when the wavelength conversion material is used.

The present technique has been made based on the circumstance as described above, and an object thereof is to suppress occurrence of color unevenness while suppressing a decrease in reliability and an increase in cost.

(1) An illumination device according to the present technique includes a light source, a wavelength conversion sheet configured to perform wavelength conversion on light from the light source, and a first light reduction portion disposed in a frame shape as a whole overlapping an outer peripheral portion of the wavelength conversion sheet in a plan view between the light source and the wavelength conversion sheet, and configured to reduce a light amount of incident light.

(2) In addition to the above-described (1), in the illumination device, the first light reduction portion may be a light reflective portion configured to reduce a light amount by reflecting incident light.

(3) In addition to the above-described (1) or (2), in the illumination device, the first light reduction portion may be formed of a resin having light reflectivity.

(4) In addition to any one of the above-described (1) to (3), in the illumination device, the first light reduction portion may be formed of a white resin in which particles having light reflectivity are dispersed and blended in a resin having an ultraviolet curing property or a thermosetting property.

(5) In addition to any one of the above-described (1) to (4), in the illumination device, the first light reduction portion may have a planar shape in which a pattern forming the frame shape is provided in a plurality of rows in a concentric annular shape, and an area of the pattern may increase from an inner side to an outer side in the concentric annular shape.

(6) In addition to any one of the above-described (1) to (5), in the illumination device, the first light reduction portion may be provided on a plate surface on the light source side of plate surfaces of the wavelength conversion sheet.

(7) In addition to any one of the above-described (1) to (5), the illumination device may further include an optical member in a plate shape disposed between the light source and the wavelength conversion sheet, and configured to provide a predetermined optical action, and the first light reduction portion may be provided on a plate surface of the optical member.

(8) In addition to any one of the above-described (1) to (7), in the illumination device, a plurality of the light sources may be linearly arranged, the illumination device may include a light guide plate including an incident end face facing a light-emitting face of each of the plurality of light sources and an emission plate surface configured to emit light, the light guide plate guiding light from the light source, the wavelength conversion sheet may be disposed in a direction in which the plate surface is located along the emission plate surface, and the first light reduction portion may be disposed between the plate surface of the wavelength conversion sheet on the light guide plate side and the emission plate surface.

(9) In addition to any one of the above-described (1) to (7), in the illumination device, a plurality of the light sources may be arranged in a planar form, the wavelength conversion sheet may be disposed in a direction in which the plate surface is located along a light-emitting face of each of the plurality of light sources, and the first light reduction portion may be disposed between the plate surface of the wavelength conversion sheet on the light-emitting face side and the light-emitting face.

(10) In addition to the above-described (9), the illumination device may further include a light source substrate on which the plurality of light sources are mounted, and a light source protection layer configured to protect the plurality of light sources, the light source protection layer being provided on a mounting surface of the light source substrate, covering the plurality of light sources, and having transparency, and the first light reduction portion may be provided on the light source protection layer.

(11) In addition to the above-described (9) or (10), the illumination device may further include a second light reduction portion disposed in a planar form as a whole, overlapping each of the plurality of light sources in a plan view, and configured to reduce a light amount by reflecting light from the light source.

(12) In addition to the above-described (11), in the illumination device, the first light reduction portion may include a portion overlapping the second light reduction portion in a plan view.

(13) In addition to the above-described (11) or (12), in the illumination device, the second light reduction portion may be a light reflective portion formed of a resin having light reflectivity.

(14) In addition to any one of the above-described (11) to (13), the illumination device may further include a light source substrate including a mounting surface on which the plurality of light sources are mounted, and a light source protection layer disposed on the mounting surface, covering the plurality of light sources, and configured to protect the plurality of light sources, and the first light reduction portion and the second light reduction portion may be provided on the light source protection layer.

(15) In addition to any one of the above-described (9) to (14), the illumination device may further include a light source substrate including a mounting surface on which the plurality of light sources are mounted, and the mounting surface may be divided into a plurality of dimming regions each having a size including at least one of the plurality of light sources, and the plurality of light sources may be configured to control light emission intensity for each of the dimming regions.

(16) A display device according to the present technique includes the illumination device according to any one of the above-described (1) to (15), and a display panel configured to perform display by using light from the illumination device.

(17) In addition to the above-described (16), the display device may be a liquid crystal panel including a liquid crystal layer.

The present technique can suppress occurrence of color unevenness while suppressing a decrease in reliability and an increase in cost.

DESCRIPTION OF EMBODIMENTS

First Embodiment

A first embodiment will be described with reference to FIGS. 1 to 5. In the present embodiment, a liquid crystal display device 10 (one example of a display device) including a backlight device 30 (one example of an illumination device) is exemplified. Note that an X-axis, a Y-axis, and a Z-axis are illustrated in a part of each drawing other than FIG. 3, and each axial direction is illustrated to be a common direction in each drawing. Further, in a Z-axis direction, a liquid crystal panel 20 side is the front side, and a backlight device 30 side is the back side.

Figure 1:
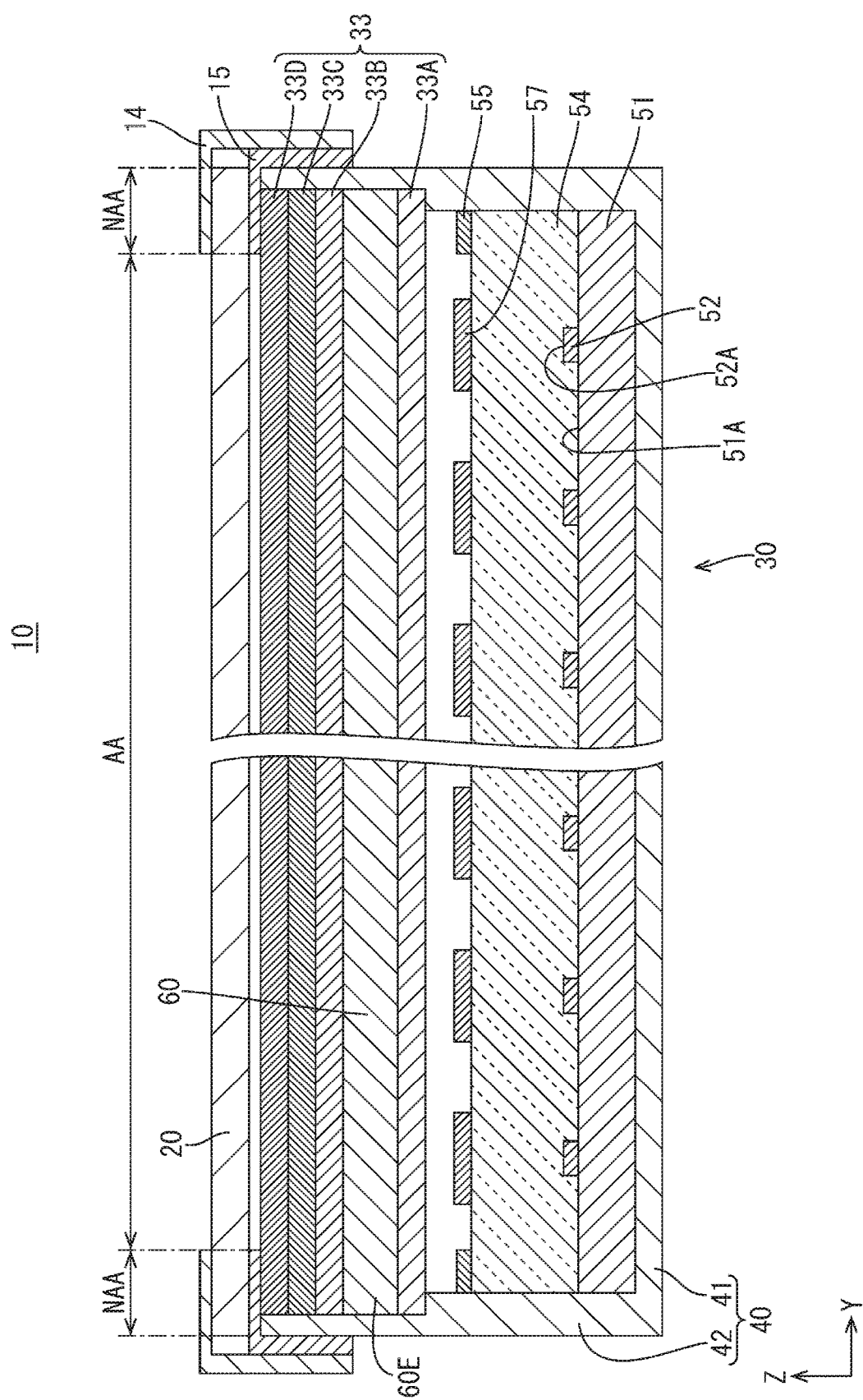
FIG. 1 is a cross-sectional view of a liquid crystal display device according to a first embodiment.

The liquid crystal display device 10 forms a horizontally oriented rectangular shape as a whole (with a long side direction as an X-axis direction and a short side direction as a Y-axis direction). As illustrated in FIG. 1, the liquid crystal display device 10 includes a liquid crystal panel 20 (one example of a display panel) that displays an image, and the backlight device 30 (one example of an illumination device) that irradiates the liquid crystal panel 20 with light. The liquid crystal panel 20 and the backlight device 30 are integrally supported by a bezel 14 and a frame 15 forming a frame-like shape. The liquid crystal panel 20 forms a horizontally oriented rectangular shape as a whole, and is sandwiched between the bezel 14 and the frame 15 in a position where a display surface that can display an image faces the front side. The liquid crystal panel 20 has a configuration in which a pair of transparent (high light-transmitting) substrates are bonded together at a predetermined gap, and a liquid crystal layer (one example of a functional material layer) is sealed between both glass substrates. It is assumed that a polarizer is disposed on an outer side of both glass substrates. A surface of the liquid crystal panel 20 is divided into a display region AA where an image is displayed, and a non-display region NAA having a frame shape so as to surround the display region AA and where an image is not displayed.

As illustrated in FIG. 1, the bezel 14 extends along a peripheral portion of the liquid crystal panel 20 on the front side, and constitutes an appearance of the liquid crystal display device 10 on the front side. The bezel 14 is formed of, for example, a metal having excellent rigidity or a resin having light blocking property. The frame 15 is formed of, for example, a resin of white and the like having excellent light reflectivity.

As illustrated in FIG. 1, the backlight device 30 includes LEDs 52 (one example of light source) that emit blue light (one example of primary light), an LED substrate 51 (one example of a light source substrate) on which the LEDs 52 are mounted, an LED protection layer 54 that protects the LEDs 52, a wavelength conversion sheet 60, a plurality of types of optical sheets 33 (one example of an optical member), and a chassis 40. The LEDs 52 are disposed in a planar shape on the back side (lower side) of the liquid crystal panel 20, and the backlight device 30 is a so-called direct backlight device. The wavelength conversion sheet 60 transmits a part of the blue light from the LED 52, and absorbs another part of the blue light to emit yellow light (one example of secondary light (complementary color light of the primary light)). The backlight device 30 is configured so as to emit combined white light (mixed light) by using the LED 52 of a blue light emitting type and the wavelength conversion sheet 60 in combination.

As illustrated in FIG. 1, the chassis 40 has a tray shape that is open toward a light emission side (liquid crystal panel 20 side), and the LED substrate 51 is housed on a base 41 of the chassis 40. An outer peripheral portion 42 of the chassis 40 protrudes to the front side to form a sidewall, and the wavelength conversion sheet 60 and various types of the optical sheets 33 are stacked to be placed on a step formed on the outer peripheral portion (sidewall) 42.

Figure 2:
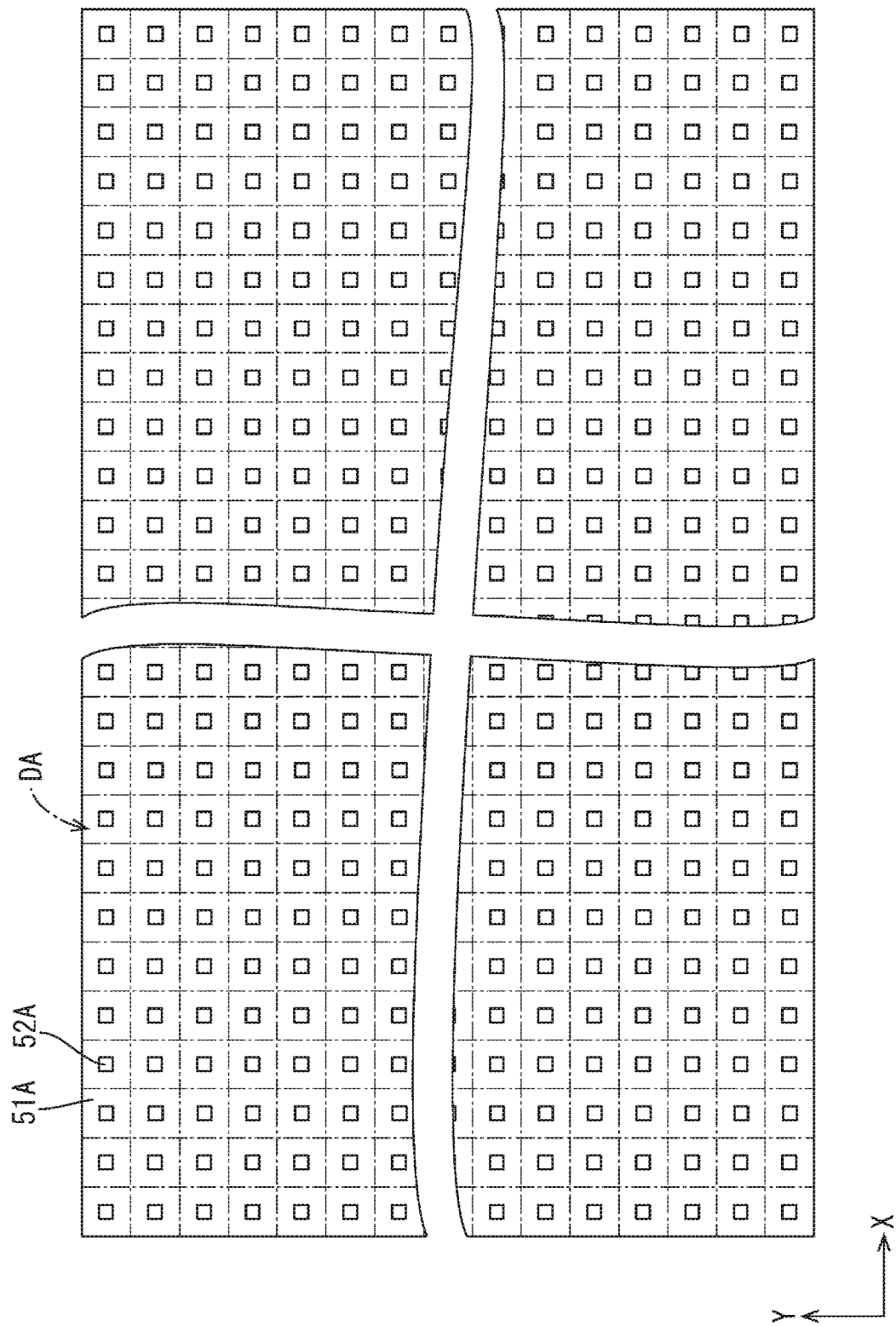
FIG. 2 is a top view of an LED substrate on which LEDs are mounted.

The LED 52 forms a rectangular parallelepiped shape, and as illustrated in FIGS. 1 and 2, a bottom face is disposed on a plate surface (mounting surface) 51A of the LED substrate 51 on the front side, and is a so-called top light emitting type (top view type) in which an upper face opposite to the bottom face is a light-emitting face 52A. An optical axis of the LED 52 (a traveling direction of light in which light emission intensity of emitted light has the highest peak) is the Z-axis direction. The LED 52 is a blue LED element (also referred to as a blue light-emitting element or a blue LED chip), does not contain a phosphor, and emits the blue light included in a wavelength region from approximately 420 nm to approximately 500 nm. For example, a model number "ES-FEBCPPE05B" manufactured by EPISTAR Corporation in which a light emission peak wavelength is approximately 450 nm can be used as the LED 52.

The wavelength conversion sheet 60 performs wavelength conversion such that the emitted light (primary light) of the LED 52 becomes light (secondary light) with a longer wavelength. More specifically, the wavelength conversion sheet 60 transmits a part of the blue light from the LED 52, and absorbs another part of the blue light to emit the yellow light (mixed light of green light and red light). The wavelength conversion sheet 60 is disposed (in an X-Y plane direction in which the plate surface is located along the light-emitting face 52A of the LED 52) such that a normal direction of the plate surface matches the optical axis of the LED 52. The wavelength conversion sheet 60 is combined with a wavelength conversion material (for example, a phosphor) dispersed in a resin having high transparency (for example, a polyester resin and an acrylic resin). The type of phosphor is not limited as long as wavelength conversion can be performed such that the primary light included in a predetermined wavelength region becomes the secondary light included in a different wavelength region. For example, a quantum dot phosphor, an inorganic phosphor, an organic phosphor, and the like are used. The present embodiment uses a quantum dot phosphor acquired by combining, at a predetermined ratio, a green quantum dot phosphor that absorbs and excites the blue light from the LED 52 to emit green light in a wavelength region from approximately 500 nm to approximately 570 nm, and a red quantum dot phosphor that absorbs and excites the blue light from the LED 52 to emit red light in a wavelength region from approximately 600 nm to approximately 780 nm is used.

Various types of the optical sheets 33 are disposed to be interposed between the LED 52 and the liquid crystal panel 20, and thus a predetermined optical action is provided to the light from the LED 52. Various types of the optical sheets 33 have been known, and one type or a plurality of types are appropriately used according to an application of the liquid crystal display device 10 and the like. In the present embodiment, as illustrated in FIG. 1, as the optical sheet 33, a dichroic sheet (dichroic filter) 33A is disposed between the LED 52 and the wavelength conversion sheet 60, and a light diffuser sheet 33B and two brightness enhancement sheets 33C and 33D are disposed between the wavelength conversion sheet 60 and the liquid crystal panel 20. In other words, the dichroic sheet 33A, the wavelength conversion sheet 60, the light diffuser sheet 33B, and the two brightness enhancement sheets 33C and 33D are stacked in this order to be placed on the sidewall 42 of the chassis 40.

The dichroic sheet 33A is an optical sheet having a band-pass filter function, and can thus improve light utilization efficiency. The dichroic sheet 33A in the present embodiment has a filter function of transmitting the blue light from the LEDs 52 and reflecting the yellow light (mixed light of the green light and the red light) from the wavelength conversion sheet 60. The light diffuser sheet 33B improves in-plane uniformity by providing a diffuser action to the light from the wavelength conversion sheet 60. The brightness enhancement sheets 33C and 33D provide a light-gathering action to emission light from the light diffuser sheet 33B, and increase front brightness. As the brightness enhancement sheets 33C and 33D, for example, Brightness Enhancement Film (BEF) (registered trademark) series manufactured by 3M Japan Limited can be used. Note that each of the two brightness enhancement sheets 33C and 33D has a configuration in which a plurality of unit lenses having a mountain shape in cross section extending along one direction are arranged along a direction orthogonal to the extending direction. The two brightness enhancement sheets 33C and 33D are arranged such that the extending directions of the unit lenses thereof are orthogonal to each other.

As illustrated in FIG. 2, the LEDs 52 are disposed in a surface form on the plate surface (mounting surface 51A) on the front side of the LED substrate 51 forming a rectangular shape. More specifically, the LEDs 52 are disposed in a lattice pattern at approximately equal intervals in the X-axis direction (row direction) and the Y-axis direction (column direction). In the present embodiment, for example, a plane size of the LED substrate 51 is approximately 345 mm (in the X-axis direction)×approximately 200 mm (in the Y-axis direction). 2048 LEDs 52 in total are mounted such that 64 LEDs 52 are mounted with an array pitch (center-to-center distance of adjacent LEDs 52) of approximately 5.37 mm in the X-axis direction, and 32 LEDs 52 are mounted with an array pitch of approximately 6.06 mm in the Y-axis direction. The plane size of the LED substrate 51 and the array pitch and the number of the LEDs 52 can be appropriately changed according to a screen size, an application, and required accuracy of the liquid crystal panel 20.

The LED substrate 51 has a configuration in which a wiring line pattern formed of a metal film such as copper foil is formed on the surface 51A of the substrate (formed of an insulating material such as glass epoxy and BT resin, for example). The LEDs 52 are soldered to be connected to an electrode being a part of the wiring line pattern. On the mounting surface 51A, a high reflective layer is preferably provided in order to increase light utilization efficiency, and a reflective sheet formed of a polyester based white resin or a PET based white resin such as an enhanced specular reflector (ESR) is preferably placed. The high reflective layer is provided by, for example, applying a high reflective coating (white coating). Note that the LED substrate 51 may be a flexible substrate (flexible printed circuits (FPC)) having flexibility and a film shape.

As illustrated in FIG. 2, the mounting surface 51A of the LED substrate 51 is divided into a plurality of dimming regions (segment regions) DA arranged in a matrix without a gap. In the present embodiment, for example, each of the dimming regions DA has a rectangular shape, and is divided such that one LED 52 is included in a center portion of each of the dimming regions DA. The dimming region DA may have the size including at least one LED 52, and the size of the dimming region DA and the number of the included LEDs 52 can be appropriately changed according to a screen size, an application, and required accuracy of the liquid crystal panel 20.

Drive power is supplied from an external power supply to the LED 52 via the wiring line pattern disposed in the mounting surface 51A. The backlight device 30 has the wiring line pattern formed such that a local dimming drive in which the drive power supplied to the LED 52 is independently controlled for each of the dimming regions DA is performed. In this way, a light emission amount of the LED 52 can be locally adjusted for each of the dimming regions DA, and a brightness adjustment with high resolution and a high contrast and low power consumption can be achieved in the backlight device 30 and the liquid crystal display device 10.

Figure 3:
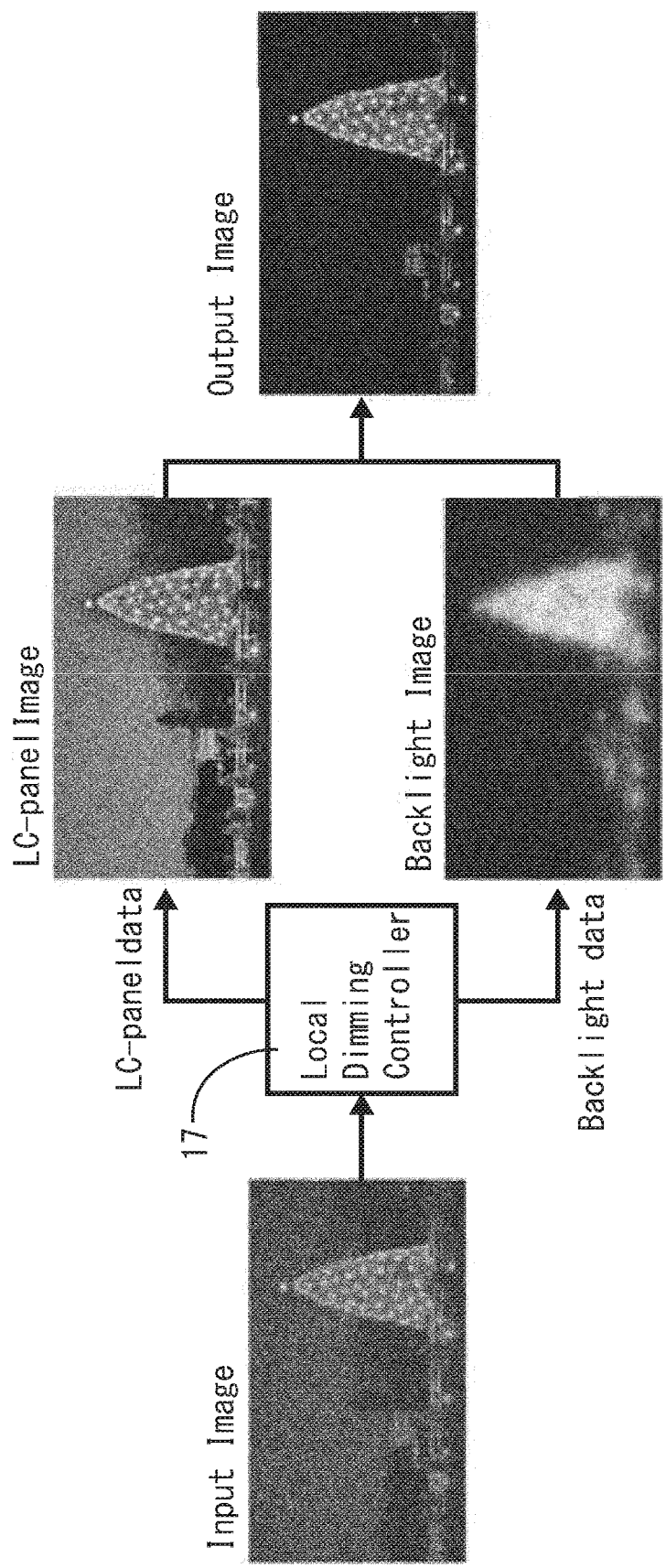
FIG. 3 is a diagram schematically illustrating the local dimming drive.

More specifically, as illustrated in FIG. 3, the liquid crystal display device 10 includes a dimming controller (local dimming controller) 17. The dimming controller 17 supplies brightness distribution data (light emission amount distribution data of the LED 52) to the backlight device 30, and supplies image data to the liquid crystal panel 20, based on image data input from the outside to the liquid crystal display device 10. In the liquid crystal display device 10, outputs of the backlight device 30 and the liquid crystal panel 20 based on each piece of the distributed data are superimposed on each other. In this way, an image having high resolution and a high contrast is generated, and a part of the LEDs 52 is controlled so as to reduce the light emission amount, thereby reducing power consumption.

Figure 4:
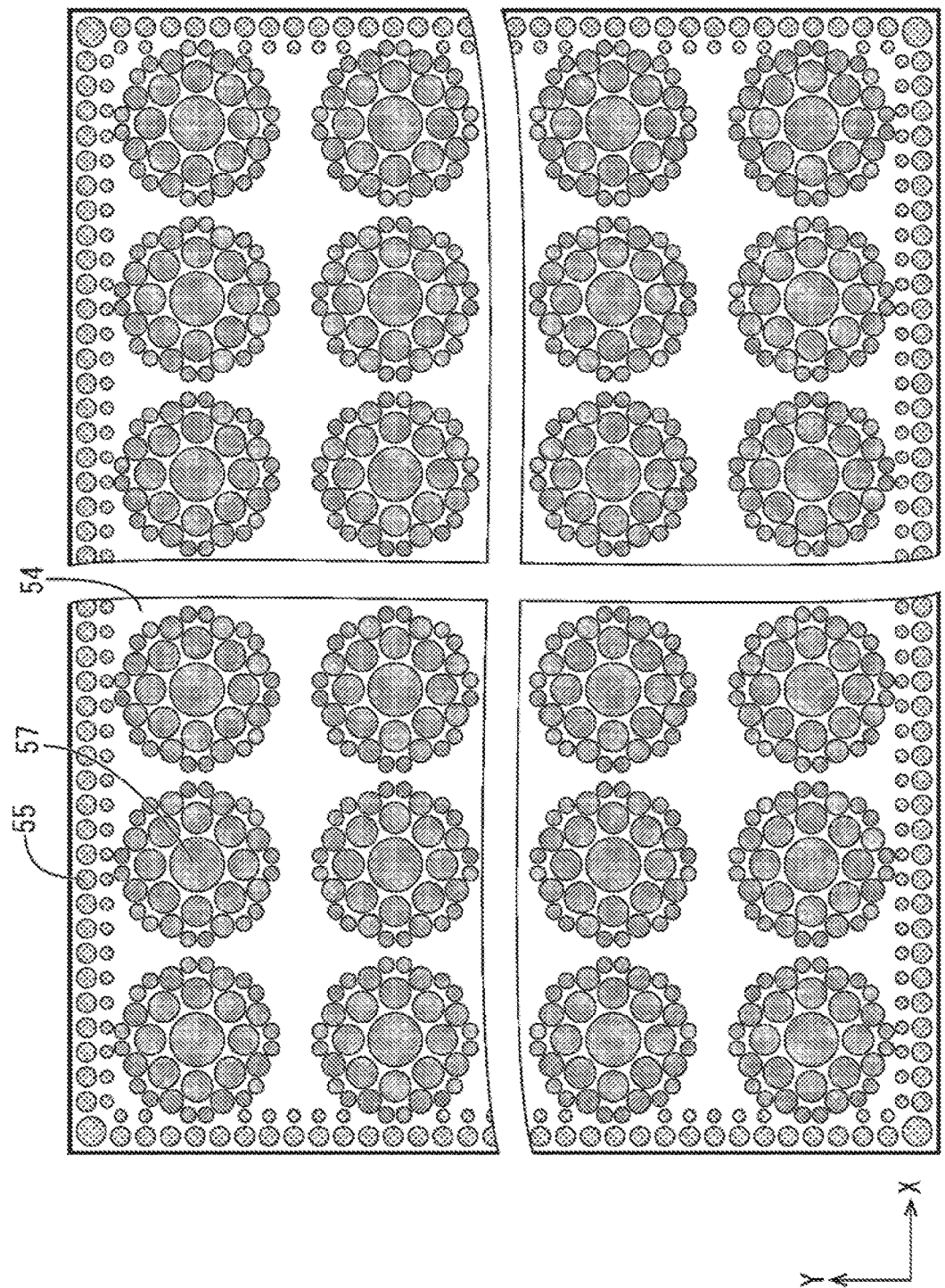
FIG. 4 is a top view of an LED protection layer.

As illustrated in FIG. 1, the LED protection layer 54 (one example of a light source protection layer) for protecting the LED 52 is provided on the mounting surface 51A of the LED substrate 51. The LED protection layer 54 is formed in a solid form across the entire mounting surface 51A so as to collectively cover the plurality of LEDs 52. In the present embodiment, for example, the LED protection layer 54 is a light-transmitting silicon resin layer, and has a layer thickness of approximately 0.8 mm. A first light reflective portion 55 and a second light reflective portion 57 that reflect light from the LED 52 to the LED 52 side are each provided on the LED protection layer 54. The first light reflective portion 55 is one example of a first light reduction portion that reduces a light amount of light incident from the LED 52. The second light reflective portion 57 is one example of a second light reduction portion that reduces a light amount of light incident from the LED 52. As illustrated in FIGS. 1 and 4, the first light reflective portion 55 is provided in a frame shape as a whole along an outer peripheral portion of the LED protection layer 54. The outer peripheral portion of the LED protection layer 54 overlaps at least an outer peripheral portion 60E of the wavelength conversion sheet 60, and also overlaps the non-display region NAA of the liquid crystal panel 20.

In general, it has been known that emission light of the backlight device 30 is more likely to be tinged with blue and color unevenness occurs in an outer peripheral portion (overlapping portion with the non-display region NAA of the liquid crystal panel 20). This is mainly caused by the fact that a part of the blue light from the LED 52 is emitted through a gap between the wavelength conversion sheet 60 and the sidewall 42 of the chassis 40 and the like without passing through the wavelength conversion sheet 60. In contrast, with the first light reflective portion 55, a large amount of the blue light present on the outer peripheral portion of the backlight device 30 is reflected with high reflectivity to return to the LEDs 52 side. In this way, an emission light amount of the blue light emitted from the LED protection layer 54 is reduced on the outer peripheral portion on which the first light reflective portion 55 is formed. As a result, in the backlight device 30, the blue light emitted through the gap between the wavelength conversion sheet 60 and the sidewall 42 of the chassis 40 and the like without passing through the wavelength conversion sheet 60 is suppressed, and thus color unevenness is suppressed.

As illustrated in FIGS. 1 and 4, the second light reflective portions 57 are provided so as to overlap at least the LEDs 52 above the LED 52. More specifically, the second light reflective portions 57 are formed in a planar form (lattice pattern) on the mounting surface 51A corresponding to the LEDs 52 disposed in a planar form (lattice pattern). Since the LED 52 is a point light source, there is concern that, in general, the emission light of the backlight device 30 is more likely to be tinged with blue in the vicinity of the LED 52 (in the vicinity of a directly upper portion overlapping the LED 52, and the like) and more likely to have a greater emission light amount than around the LED 52 (in the vicinity of the center between adjacent LEDs 52, and the like), and color unevenness and brightness unevenness referred to as a so-called hot spot and LED unevenness occur. In contrast, with the second light reflective portion 57, a large amount of the blue light present near the LED 52 is reflected with high reflectivity to return to the LED 52 side. Meanwhile, a small amount of the blue light present around the LED 52 is reflected with only low reflectivity, and a large amount of the remaining blue light is transmitted. In this way, the blue light emitted from the LED protection layer 54 on which the second light reflective portion 57 is formed is less likely to vary in the emission light amount near the LED 52 and around the LED 52. As a result, in irradiation light of the backlight device 30, color unevenness and brightness unevenness caused by an arrangement of the LED 52 can be resolved, and in-plane uniformity can be improved.

The first light reflective portion 55 and the second light reflective portion 57 are formed of a white resin material in which particles having light reflectivity (for example, titanium oxide particles having a high refractive index) are dispersed and blended in a resin having an ultraviolet curing property. The first light reflective portion 55 and the second light reflective portion 57 are formed by printing the white resin material on the LED protection layer 54 with an ink-jet printing device and by ultraviolet curing. The white resin material is less likely to degrade due to heat and humidity, and also is more inexpensive than the wavelength conversion material. Thus, occurrence of color unevenness can be suppressed while suppressing a decrease in reliability and an increase in cost as compared to the wavelength conversion material (for example, the quantum dot phosphor).

As illustrated in FIG. 4, the first light reflective portions 55 form a planar shape in which a dot-shaped pattern formed at a predetermined interval so as to form a rectangular frame shape is provided in a plurality of rows (for example, two rows in the present embodiment) in a concentric annular shape. An outer diameter of each of the dots constituting the dot-shaped pattern is formed larger in a row on an outer side than in a row on an inner side in the concentric annular shape. In this way, an adjustment is made such that an area of the dot-shaped pattern increases from the inner side to the outer side in the concentric annular shape, and reflectivity of the first light reflective portion 55 increases from the inner side to the outer side in the concentric annular shape. As a result, color unevenness caused by the blue light emitted through the gap between the wavelength conversion sheet 60 and the sidewall 42 of the chassis 40 and the like without passing through the wavelength conversion sheet 60 can be effectively suppressed.

As illustrated in FIG. 4, the second light reflective portion 57 forms a planar shape in which a dot-shaped pattern formed at a predetermined interval so as to form a circular shape is provided in a plurality of rows in a concentric annular shape. An outer diameter of each of the dots constituting the dot-shaped pattern is formed so as to decrease from an inner side to an outer side in the concentric annular shape. In this way, an adjustment is made such that an area of the dot-shaped pattern decreases from the inner side (directly above the LED 52) to the outer side in the concentric annular shape, and reflectivity of the second light reflective portion 57 decreases from the inner side to the outer side in the concentric annular shape. As a result, color unevenness and brightness unevenness caused by the arrangement of the LEDs 52 can be effectively suppressed.

As described above, the backlight device 30 according to the present embodiment includes the LEDs 52, the wavelength conversion sheet 60 that performs wavelength conversion on light from the LED 52, and the first light reflective portion 55 that is disposed in a frame shape as a whole overlapping the outer peripheral portion 60E of the wavelength conversion sheet 60 in a plan view and that reduce a light amount of incident light. In this way, a large amount of blue light present on the outer peripheral portion of the backlight device 30 is reflected with high reflectivity by the first light reflective portion 55 to return to an incident side (the LED 52 side in an emission light path). In this way, an emission light amount of the blue light emitted from the LED protection layer 54 is reduced on the outer peripheral portion on which the first light reflective portion 55 is formed, and the blue light emitted through the gap between the wavelength conversion sheet 60 and the sidewall 42 of the chassis 40 and the like without passing through the wavelength conversion sheet 60 is suppressed. As a result, a situation where the emission light of the backlight device 30 is tinged with blue on the outer peripheral portion and color unevenness occurs can be suppressed.

Further, the first light reflective portion 55 has an action of reducing a light amount of light incident on the first light reflective portion 55, and a wavelength conversion action is not needed. Thus, the wavelength conversion material (for example, the quantum dot phosphor) does not need to be used for the purpose of suppressing color unevenness as described in US 2020/0,064,690 A, thereby suppressing a decrease in reliability and an increase in cost caused by the wavelength conversion material.

Further, the first light reflective portion 55 is disposed between the LED 52 and the wavelength conversion sheet 60 (more specifically, on the LED protection layer 54). Provided that the first light reflective portion 55 is disposed above (closer to the front side than) the wavelength conversion sheet 60, not only a light amount of the blue light emitted from the LED 52 but also a light amount of the green light and the red light emitted from the wavelength conversion sheet 60 are reduced by the first light reflective portion 55. Thus, by disposing the first light reflective portion 55 between the LED 52 and the wavelength conversion sheet 60, such a situation can be suppressed, and color unevenness can be suppressed without reducing brightness.

Figure 5:
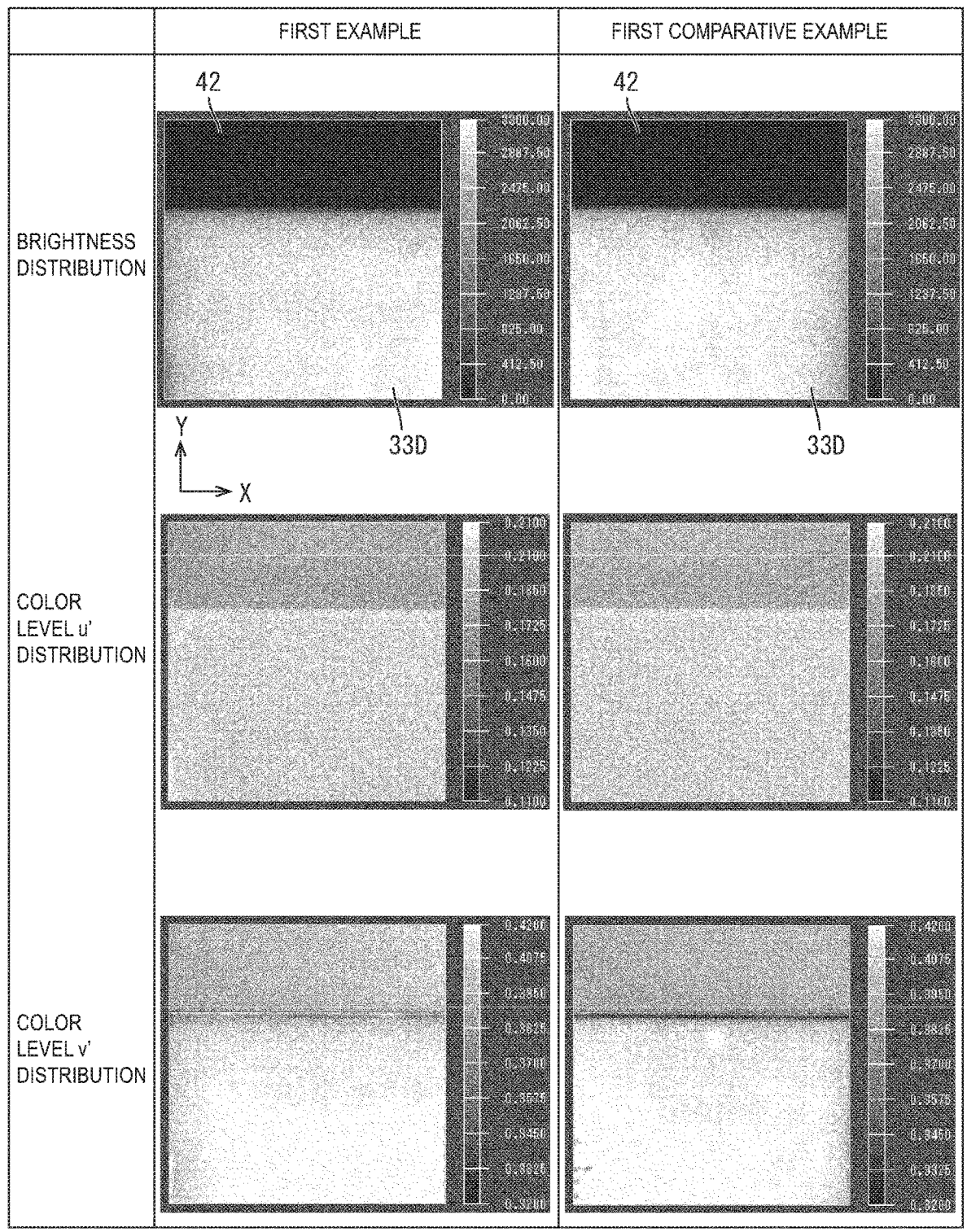
FIG. 5 is a diagram showing a first comparative experimental result.

A first comparative experiment was performed in order to verify an action and an effect of the first light reflective portion 55. A first comparative experimental result is shown in FIG. 5.

First Comparative Experiment

In the first comparative experiment, in-plane distributions of brightness and color levels (u', v') of irradiation light of a backlight device were measured with a two-dimensional brightness color level meter "CA-2000" manufactured by KONICA MINOLTA, INC. to evaluate occurrence of color unevenness. A first example is the backlight device 30 including the first light reflective portion 55 described above, and a first comparative example 1 is a backlight device without including the first light reflective portion 55. In the first comparative example, as illustrated in the distribution of the color level v', it was measured that a value of the color level v' decreased on a boundary portion with the sidewall 42 of the chassis 40 (concentration was dark and displayed in black in the drawing), and the irradiation light (emission light from the brightness enhancement sheet 33D) of the backlight device was tinged with blue on the boundary portion. On the other hand, in the first example, it was confirmed that a decrease in the color level v' on the boundary portion was suppressed (the concentration was light in the drawing), and a blue tinge of the irradiation light of the backlight device 30 was reduced on the boundary portion. Further, it was confirmed that brightness and the color level u' in the first example were almost unchanged from the first comparative example, and thus blue color unevenness can be suppressed without reducing brightness.

Second Embodiment

A backlight device 130 and a liquid crystal display device 110 including the backlight device 130 according to a second embodiment will be described with reference to FIGS. 6 to 8. In the present embodiment, the backlight device 130 includes a light diffuser plate 70 (another example of an optical member), and first light reflective portions 155 and second light reflective portions 157 are provided on a plate surface 70A of the light diffuser plate 70 on the front side. In the second embodiment, redundant descriptions of configurations, an action, and effects similar to those of the first embodiment will be omitted.

Figure 6:
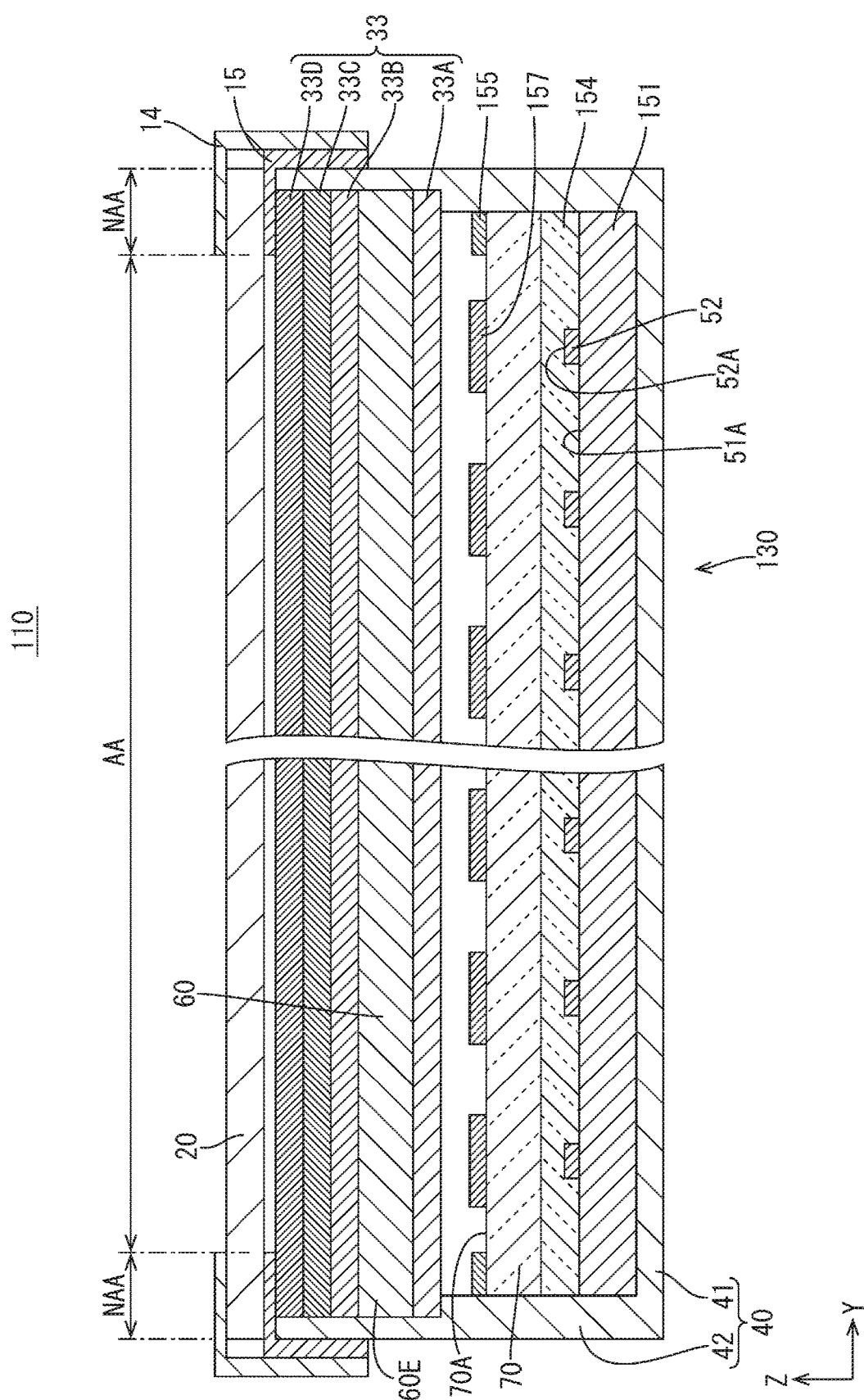
FIG. 6 is a cross-sectional view of a liquid crystal display device according to a second embodiment.

As illustrated in FIG. 6, the backlight device 130 is formed such that a layer thickness of an LED protection layer 154 is approximately 0.3 mm and is less than that in the first embodiment. The light diffuser plate 70 is disposed on the LED protection layer 154, and the first light reflective portion 155 and the second light reflective portion 157 are formed on the light diffuser plate 70 instead of the LED protection layer 154.

The light diffuser plate 70 forms a flat plate shape thicker than a wavelength conversion sheet 60 and various types of optical sheets 33, and diffuses transmitted light. The light diffuser plate 70 has a configuration in which a plurality of diffuser particles are dispersed in a base material formed of, for example, a transparent resin. As the light diffuser plate 70, for example, a model number "DR-75CX" manufactured by NITTO JUSHI KOGYO CO., LTD. having a plate thickness of approximately 0.5 mm can be used.

Figure 7:
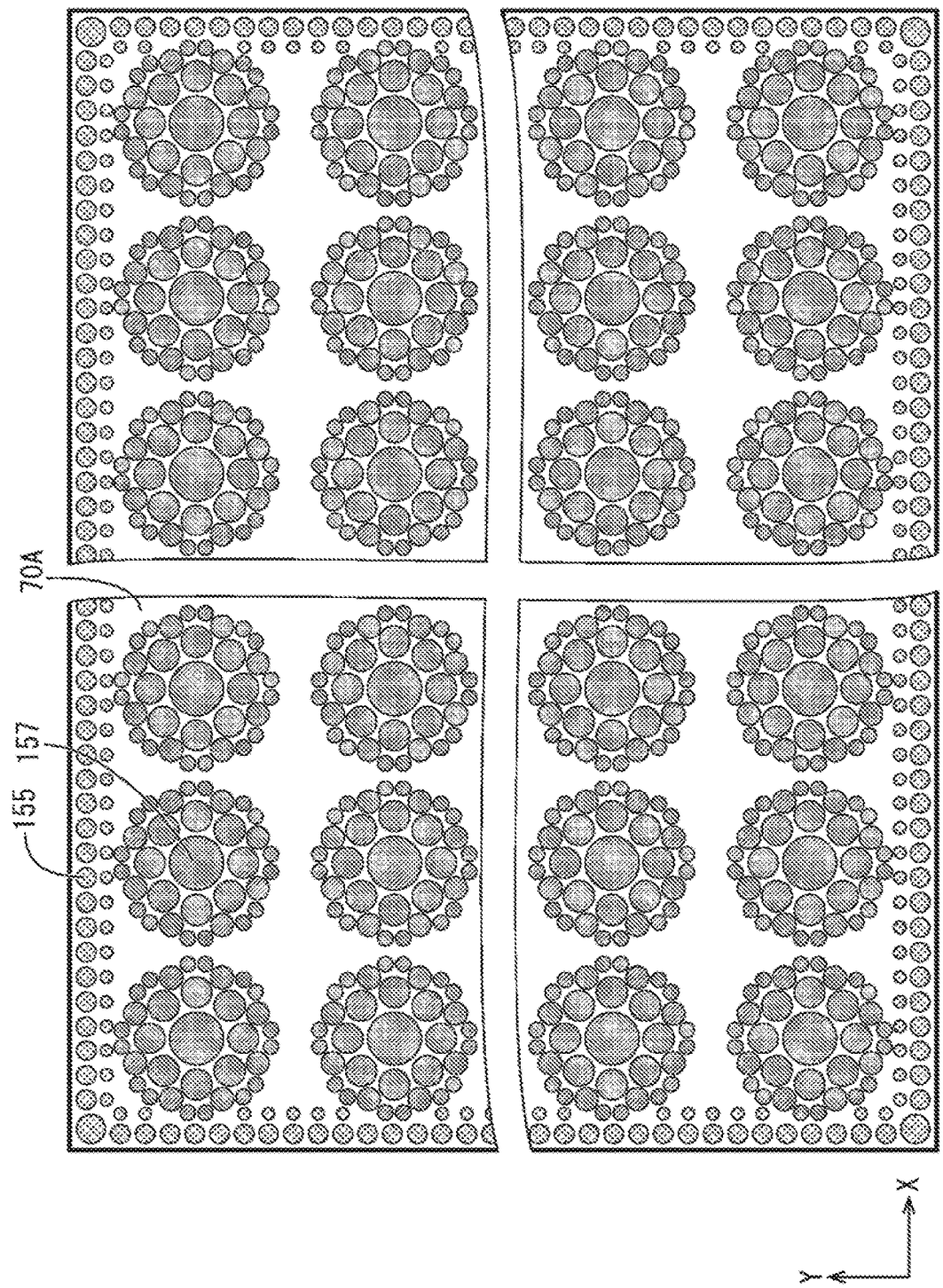
FIG. 7 is a top view of a light diffuser plate.
Figure 8:
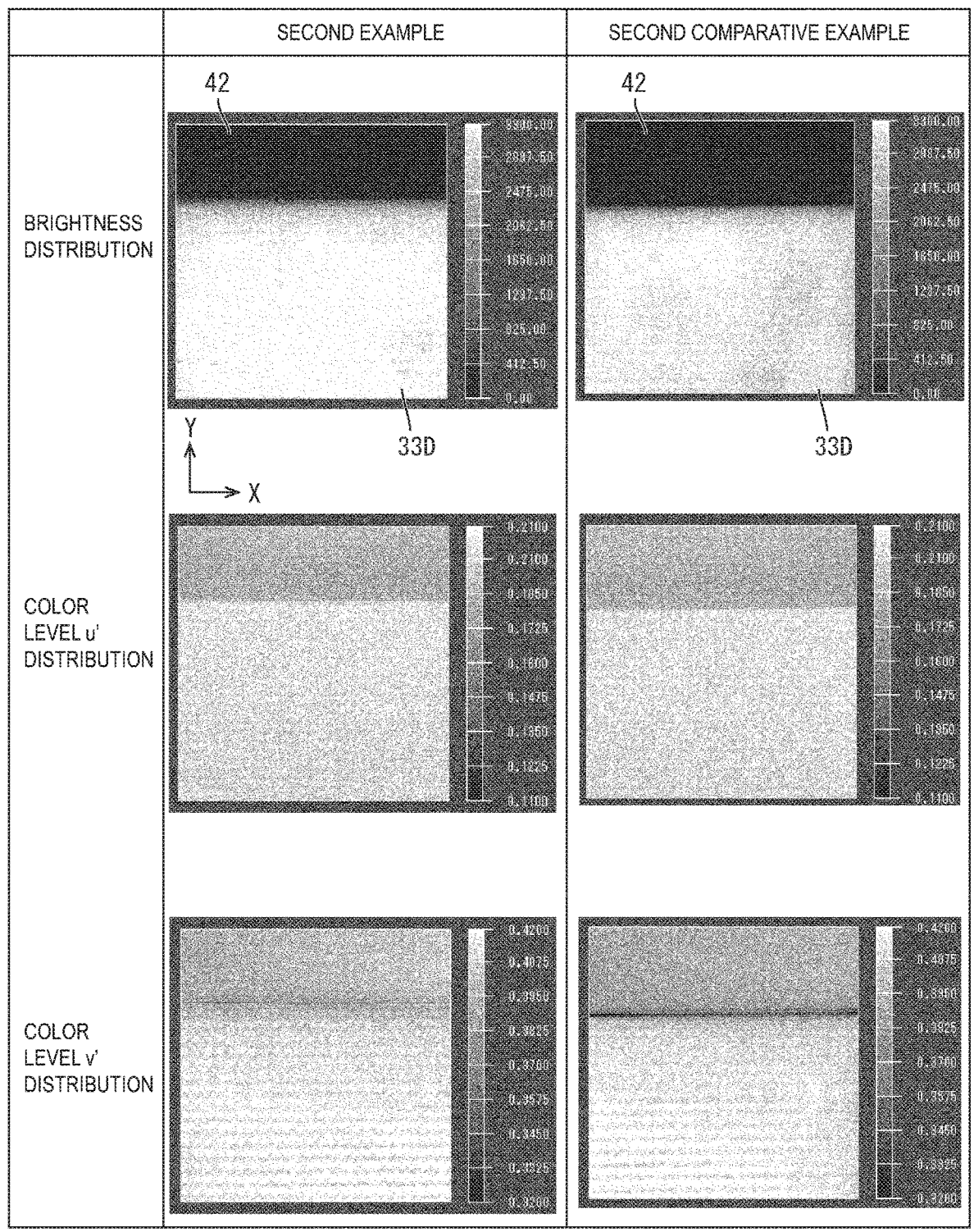
FIG. 8 is a diagram showing a second comparative experimental result.

As illustrated in FIG. 7, the first light reflective portion 155 and the second light reflective portion 157 are formed so as to have substantially the same planar shape as the first embodiment, on the plate surface 70A of the light diffuser plate 70 on the front side. The first light reflective portion 155 and the second light reflective portion 157 are formed of a white resin material in which particles having light reflectivity (for example, titanium oxide particles having a high refractive index) are dispersed and blended in a resin having a thermosetting property. The first light reflective portion 155 and the second light reflective portion 157 are formed by printing the white resin material on the light diffuser plate 70 in a dot shape with a screen printing device and by thermal curing. The white resin material is less likely to degrade due to heat and humidity, and a decrease in reliability and an increase in cost can be suppressed as compared to a case where a wavelength conversion material (for example, a quantum dot phosphor) is used for the purpose of suppressing color unevenness.

The light diffuser plate 70 is more inexpensive than a silicon resin being a raw material of the LED protection layer 154. Thus, in the present embodiment, a cost can be further reduced by thinning the LED protection layer 154 while ensuring in-plane uniformity by the light diffuser plate 70.

A second comparative experiment was performed in order to verify an action and an effect of the first light reflective portion 155 according to the present embodiment. A second comparative experimental result is shown in FIG. 8.

Second Comparative Experiment

In the second comparative experiment, in-plane distributions of brightness and color levels (u', v') of irradiation light of a backlight device were measured with a two-dimensional brightness color level meter "CA-2000" manufactured by KONICA MINOLTA, INC., to evaluate occurrence of color unevenness. A second example is the backlight device 130 including the first light reflective portion 155 described above, and a second comparative example is a backlight device without including the first light reflective portion 155. In the second comparative example, as illustrated in the distribution of the color level v', it was measured that a value of the color level v' decreased (concentration was dark and displayed in black in the drawing) on a boundary portion with a sidewall 42 of a chassis 40, and the irradiation light of the backlight device was tinged with blue on the boundary portion. On the other hand, in the second example, it was confirmed that a decrease in the color level v' on the boundary portion was suppressed (the concentration was light in the drawing), and a blue tinge of the irradiation light of the backlight device 130 on the boundary portion was reduced. Further, it was confirmed that brightness and the color level u' in the second example were almost unchanged from the second comparative example, and thus blue color unevenness can be suppressed without reducing brightness.

Third Embodiment

A backlight device 230 and a liquid crystal display device 210 including the backlight device 230 according to a third embodiment will be described with reference to FIGS. 9 to 11. In the present embodiment, an LED 252 is configured to emit magenta light, the backlight device 230 includes a light diffuser plate 170, and a first light reflective portion 255 is provided on a plate surface 170A of the light diffuser plate 170 on the front side. In the third embodiment, redundant descriptions of configurations, an action, and effects similar to those of the first embodiment and the second embodiment will be omitted.

The LED 252 is disposed in a planar form (lattice pattern) on a mounting surface 51A of the LED substrate 51, and has an array pitch of the LED 252 greater than that of the LED 52 in the first embodiment. In the present embodiment, for example, a plane size of the LED substrate 51 is approximately 590 mm (in the X-axis direction)×approximately 330 mm (in the Y-axis direction), and 512 LEDs 252 in total are mounted such that 32 LEDs 252 are mounted with an array pitch of approximately 18.7 mm in the X-axis direction, and 16 LEDs 252 are mounted with an array pitch of approximately 21.0 mm in the Y-axis direction.

Figure 10:
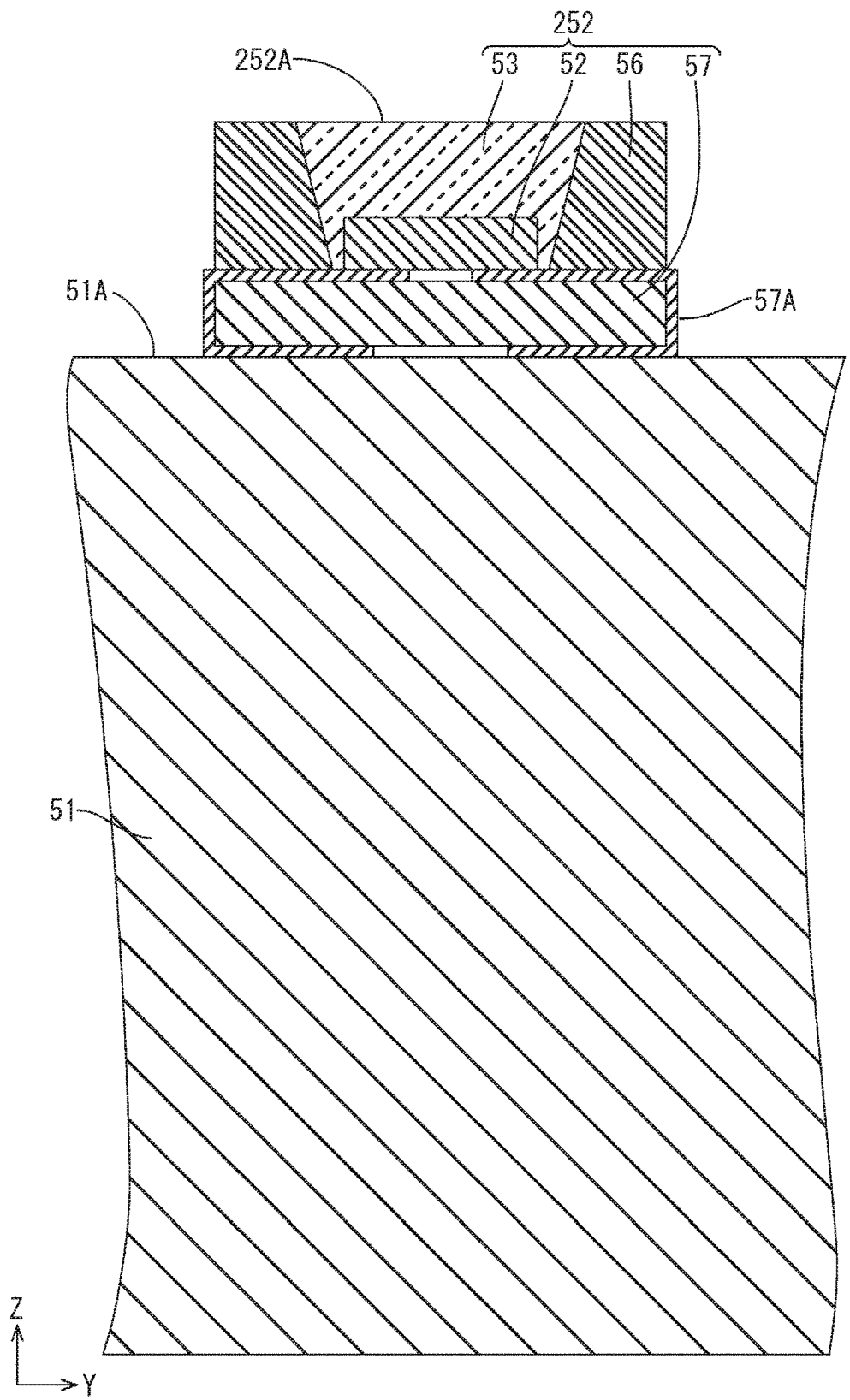
FIG. 10 is an enlarged cross-sectional view in the vicinity of an LED in FIG. 9.

As illustrated in FIG. 10, the LED 252 includes a blue LED chip 52, a fluoresce sealing material 53, a housing (reflector) 56 that surrounds the blue LED chip 52 from a side and is filled with the fluoresce sealing material 53, and a blue LED chip mounting substrate 57 on which the fluoresce sealing material 53 and the housing 56 are placed and the blue LED chip 52 is also mounted. The LED 252 forms a rectangular parallelepiped shape, and has the plane size of, for example, an approximately 3 mm square. The blue LED chip 52 has substantially the same configuration as the LED 52 in the first embodiment, and emits blue light. The blue LED chip 52 is soldered to be connected to a wiring line pattern disposed on the LED substrate 51 via an electrode 57A provided on the blue LED chip mounting substrate 57. For example, a model number "ES-FEBCPPE38E" manufactured by EPISTAR Corporation in which a light emission peak wavelength is approximately 450 nm can be used as the blue LED chip 52.

The fluoresce sealing material 53 is formed of a silicon resin containing a red phosphor. The fluoresce sealing material 53 absorbs a part of the blue light emitted from the blue LED chip 52 to emit red light, and seals the blue LED chip 52 in the housing 56. In this way, the magenta light (primary light) in which the blue light and the red light are mixed is emitted from a light-emitting face 252A of the LED 252.

As illustrated in FIG. 10, the housing 56 is disposed on the mounting surface 51A of the LED substrate 51 so as to surround the blue LED chip 52 from the side. The housing 56 is a molded body formed of a white silicon resin in which particles having light reflectivity (for example, titanium oxide particles having a high refractive index) are dispersed and blended, and also serves as the reflector. An inner side surface of the housing 56 is inclined so as to emit, from the light-emitting face 252A, the blue light from the blue LED chip 52 and the red light from the fluoresce sealing material 53.

Figure 9:
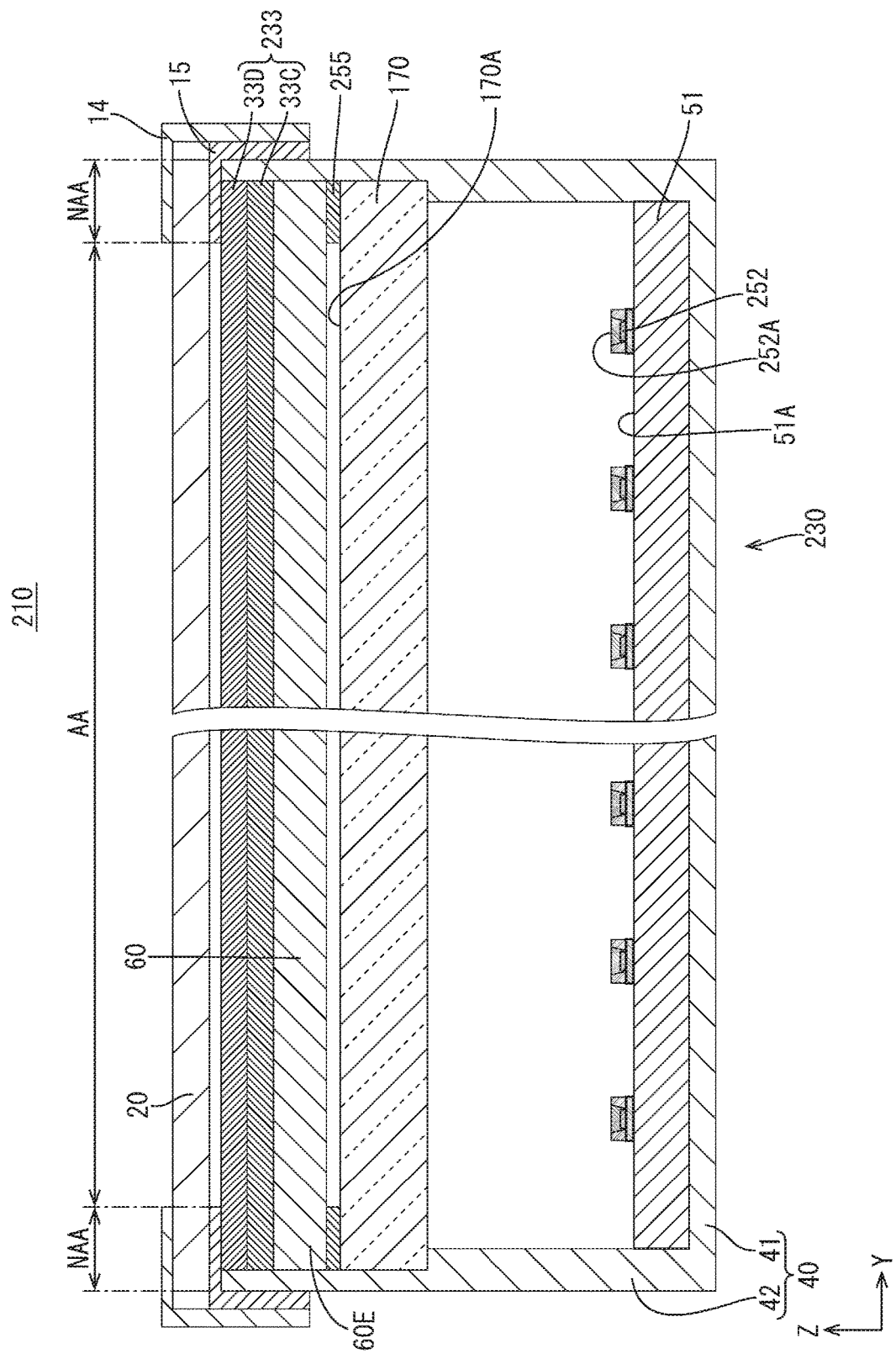
FIG. 9 is a cross-sectional view of a liquid crystal display device according to a third embodiment.

As illustrated in FIG. 9, the light diffuser plate 170 is disposed above the LED 252. In contrast to the first embodiment, the LED protection layer 54 is not provided on the LED substrate 51, and the light diffuser plate 170 is disposed facing the mounting surface 51A of the LED substrate 51 at an interval of approximately 15 mm from the mounting surface 51A. As the light diffuser plate 170, for example, "EML-B series" manufactured by Entire Technology Co., Ltd. having a plate thickness of approximately 0.2 mm can be used.

Figure 11:
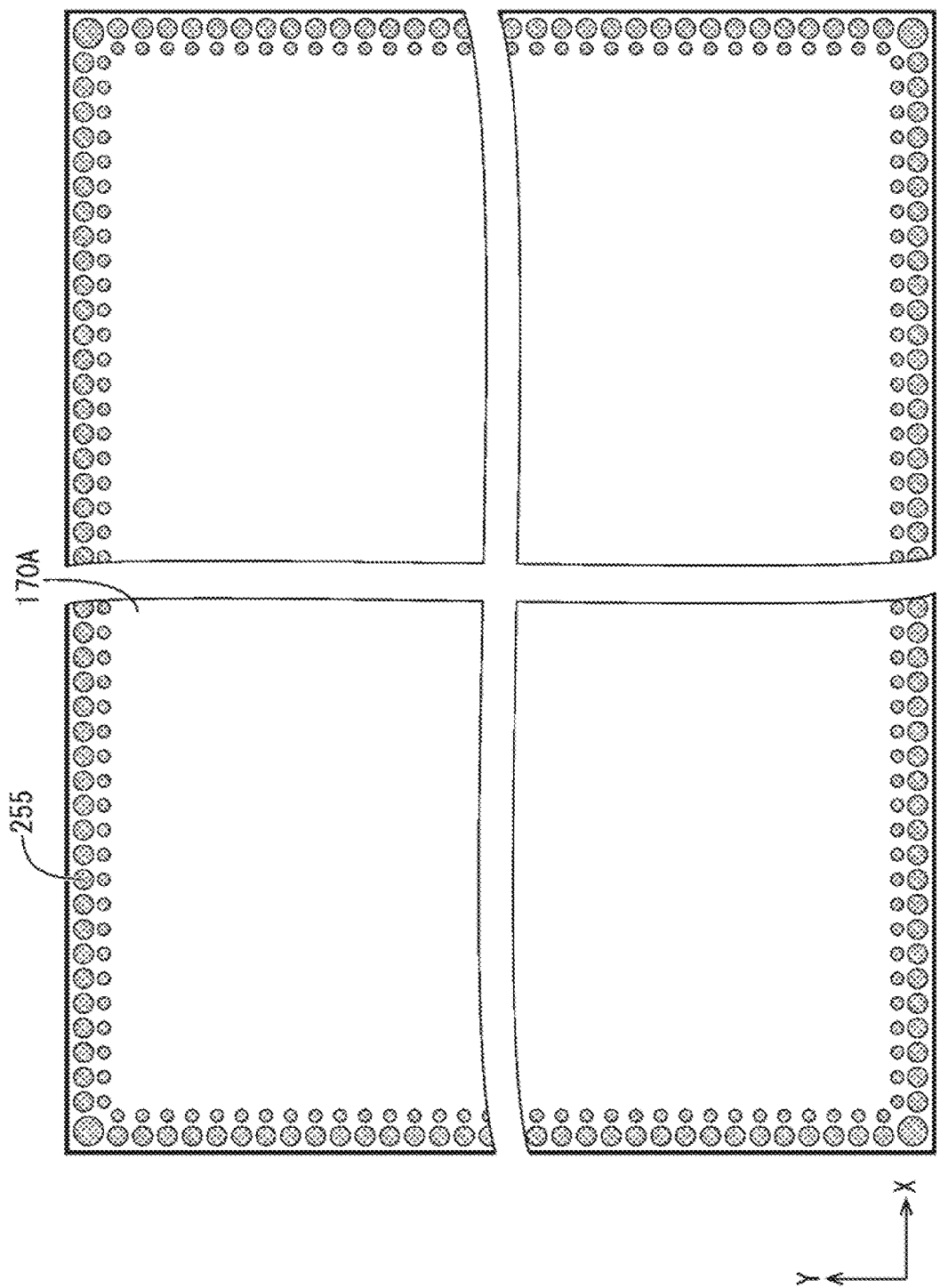
FIG. 11 is a top view of a light diffuser plate.

As illustrated in FIGS. 9 and 11, the first light reflective portion 255 is formed along an outer peripheral portion on the plate surface 170A of the light diffuser plate 170 on the front side (a wavelength conversion sheet 60 side). The first light reflective portion 255 is formed by a similar raw material and a similar manufacturing method so as to have substantially the same planar shape as the first light reflective portion 155 according to the second embodiment. Note that, in contrast to the second embodiment, the second light reflective portion 157 is not formed.

The wavelength conversion sheet 60 is substantially the same as that in the first embodiment, but transmits a part of the blue light included in the magenta light from the LED 252, and absorbs another part of the blue light to emit green light. Further, two brightness enhancement sheets 33C and 33D are provided as an optical sheet 233, and the dichroic sheet 33A and the light diffuser sheet 33B are not provided.

Fourth Embodiment

A backlight device 330 and a liquid crystal display device 310 including the backlight device 330 according to a fourth embodiment will be described with reference to FIGS. 12 and 13. In the present embodiment, the backlight device 330 is configured in a so-called edge light type (side light type), and a first light reflective portion 355 is provided on a plate surface 60A of a wavelength conversion sheet 60 on the back side. In the fourth embodiment, redundant descriptions of configurations, actions, and effects similar to those of the first embodiment to the third embodiment will be omitted.

The backlight device 330 forms a horizontally oriented rectangular shape in a plan view similarly to the liquid crystal panel 20. As illustrated in FIG. 12, the backlight device 330 includes an LED 352, an LED substrate 351 on which the LED 352 is mounted, a light guide plate 75 that guides light from the LED 352, and a reflective sheet 80 that reflects, to the light guide plate 75 side, light leaking from the light guide plate 75. The LED 352, the LED substrate 351, the light guide plate 75, and the reflective sheet 80 are housed in a chassis 340. Further, the wavelength conversion sheet 60, a light diffuser sheet 33B, and two brightness enhancement sheets 33C and 33D are stacked on the light guide plate 75 so as to overlap each other. The backlight device 330 is an edge light type of a one-side light entering type in which light of the LED 352 is incident only from one long-side end face (incident end face) 75A of the light guide plate 75. The backlight device of the edge light type is reduced in thickness more easily than that of a direct type.

Figure 12:
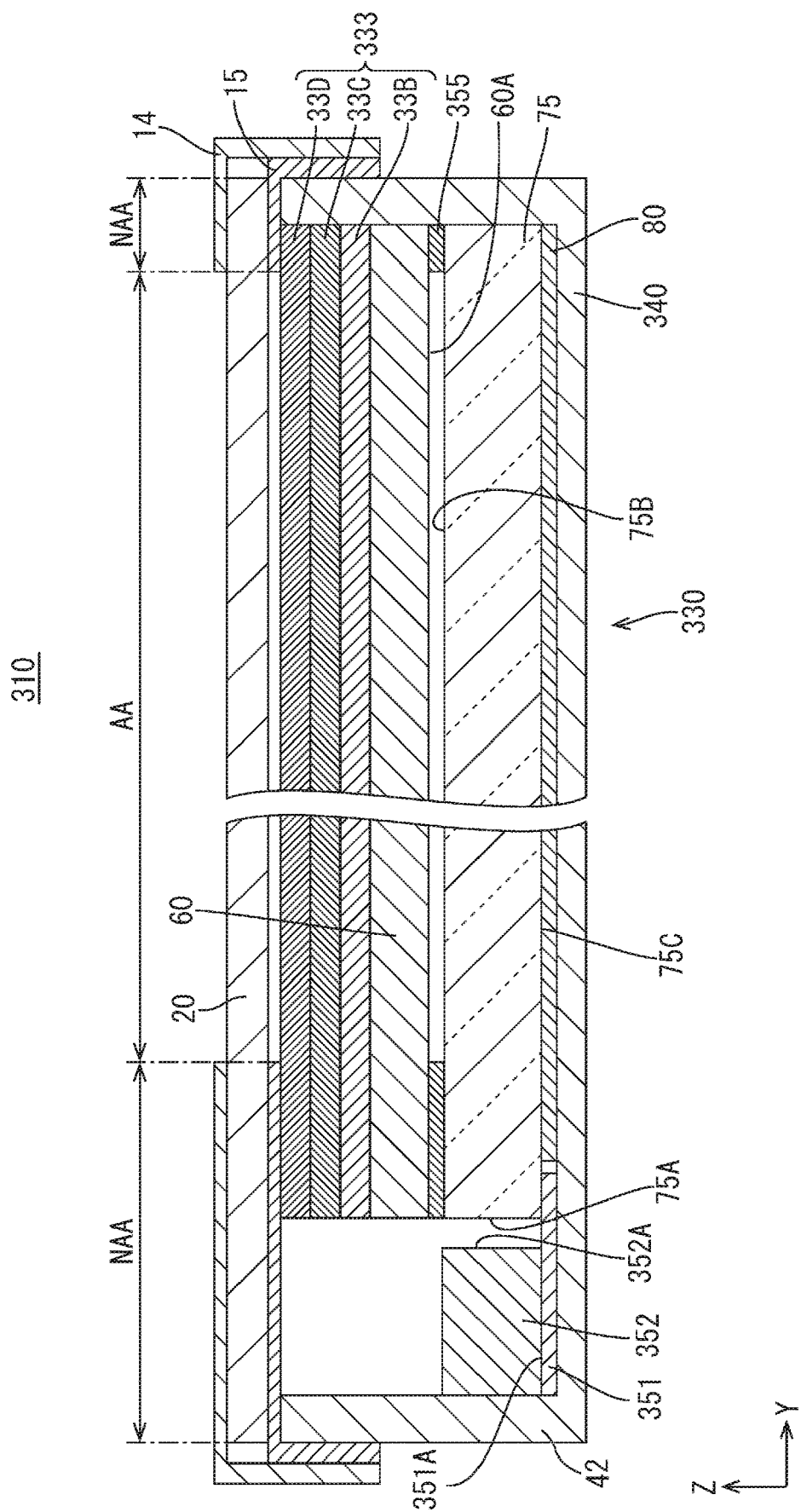
FIG. 12 is a cross-sectional view of a liquid crystal display device according to a fourth embodiment.

As illustrated in FIG. 12, the LED substrate 351 has an elongated plate shape extending along an incident end face 75A of the light guide plate 75. The LEDs 352 are linearly disposed along a mounting surface 351A of the LED substrate 351. The LED 352 has a rectangular parallelepiped shape, and is a so-called side surface light emitting type (side view type) in which one side surface is a light-emitting face 352A. An optical axis of the LED 352 is the Y-axis direction. The LED 352 is a blue LED chip similarly to the LED 52 in the first embodiment. For example, a model number "LB Y8SG" manufactured by Osram Ltd. in which a light emission peak wavelength is approximately 455 nm can be used as the LED 352. In the present embodiment, for example, a length of the LED substrate 351 in a long side direction (the X-axis direction) is approximately 345 mm, and 64 LEDs 352 are mounted with an array pitch of approximately 5.4 mm in the X-axis direction.

The light guide plate 75 has a flat plate shape thicker than the wavelength conversion sheet 60 and various types of optical sheets 333, and has a plane size of, for example, approximately 345 mm (in the X-axis direction)×approximately 200 mm (in the Y-axis direction) in the present embodiment. The light guide plate 75 is an injection molded plate formed of a resin having a refractive index sufficiently greater than air and having high transparency (for example, polycarbonate), and a fine concave-convex structure and the like are formed on a plate surface. The light guide plate 75 introduces, from the incident end face 75A, light emitted from the LED 352, propagates the light therein along the Y-axis direction, raises the light such that the light faces the wavelength conversion sheet 60 side, and emits the light from an emission plate surface 75B.

The reflective sheet 80 is disposed on a plate surface 75C side of the light guide plate 75 on the back side (opposite side to the wavelength conversion sheet 60), and reflects, to the light guide plate 75 side, the light leaking from the light guide plate 75. The reflective sheet 80 is a sheet-shaped member with a surface having excellent light reflectivity, and is formed of, for example, a white resin, but various types of the reflective sheets 80 can be used.

Figure 13:
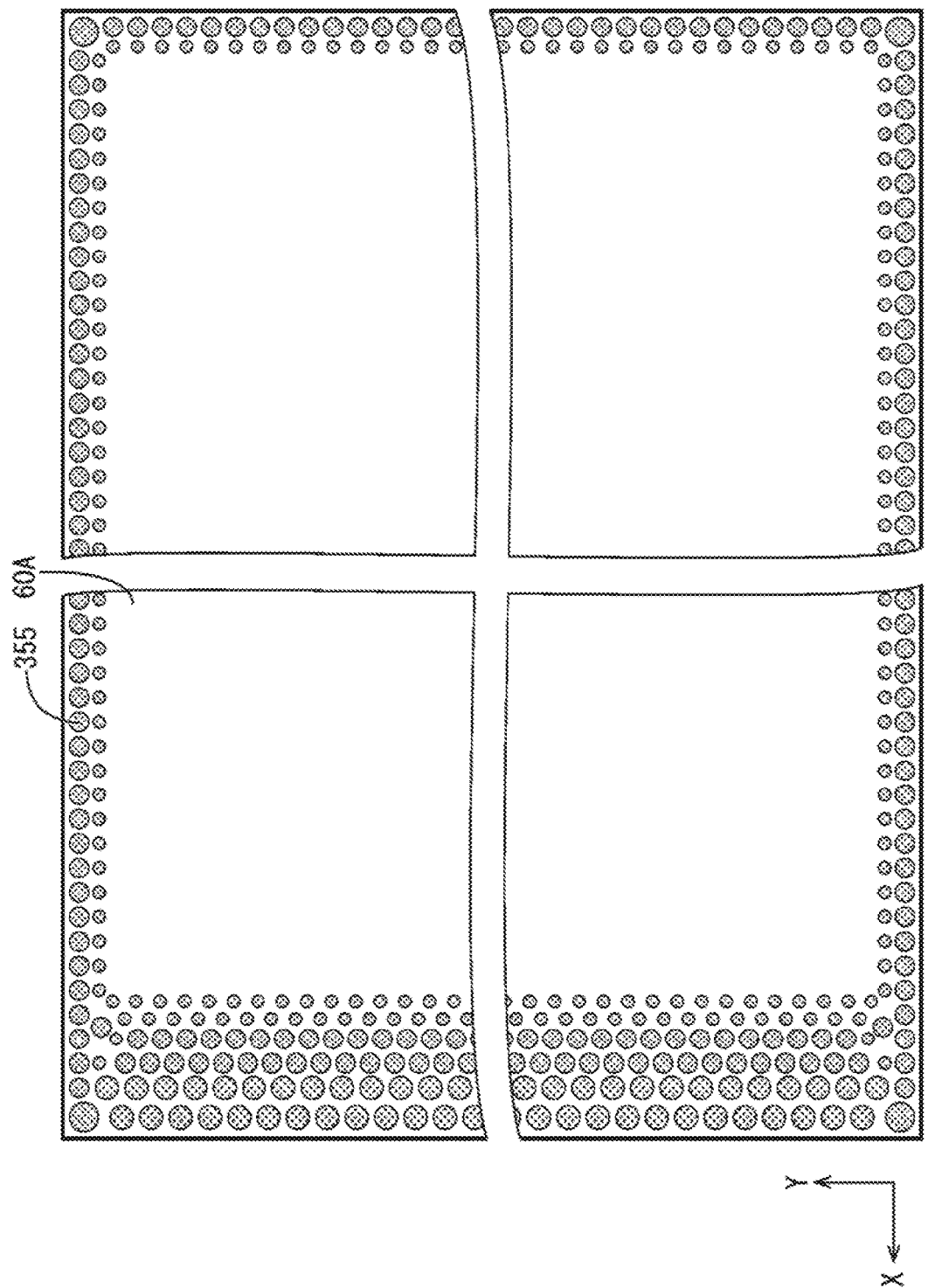
FIG. 13 is a bottom view of a wavelength conversion sheet.

As illustrated in FIG. 13, the first light reflective portion 355 is formed along an outer peripheral portion on the plate surface 60A of the wavelength conversion sheet 60 on the back side (the light guide plate 75 side). The first light reflective portion 355 is formed such that a portion along a long side portion on a side provided with the LED 352 is wider than another portion. Since a distance between the portion and the LED 352 is small, a light amount of blue light emitted through a gap between the wavelength conversion sheet 60 and a sidewall 42 of the chassis 340 and the like without passing through the wavelength conversion sheet 60 is more likely to increases, and color unevenness caused by the increase is more likely to significantly occur. Thus, by forming the first light reflective portion 355 of the portion to be wider, a reflection effect can be enhanced, and color unevenness can be effectively suppressed. The first light reflective portion 355 is formed on the wavelength conversion sheet 60 with a raw material and by a manufacturing method similar to those of the first light reflective portion 155 according to the second embodiment. Note that, in contrast to the second embodiment, the second light reflective portion 157 is not formed.

The light diffuser sheet 33B and the two brightness enhancement sheets 33C and 33D are provided as the optical sheet 333, and in contrast to the first embodiment, the dichroic sheet 33A is not provided.

Other Embodiments

The disclosure is not limited to the embodiments described above and illustrated by the drawings, and embodiments such as those described below are also included within the technical scope of the disclosure.

(1) A first light reduction portion is not limited to the first light reflective portions 55, 155, 255, and 355 that reduce a light amount by reflection, and may have an action of reducing a light amount of light by absorption, for example. In this case, the first light reduction portion can be formed of an ultraviolet-curing resin, a thermosetting resin, and the like including a light absorption material (a coloring agent).

Figure 14:
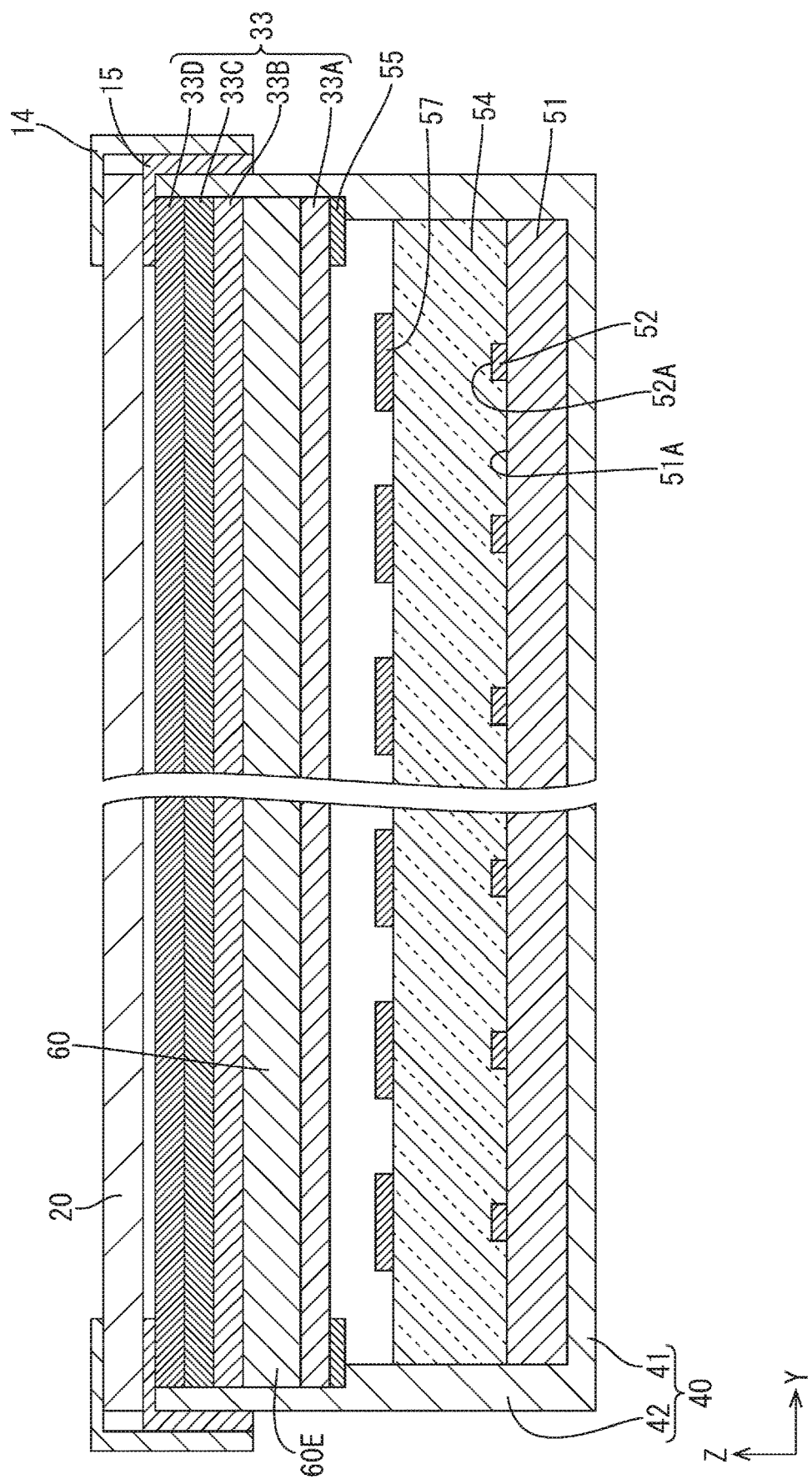
FIG. 14 is a cross-sectional view of a liquid crystal display device according to another embodiment.
Figure 15:
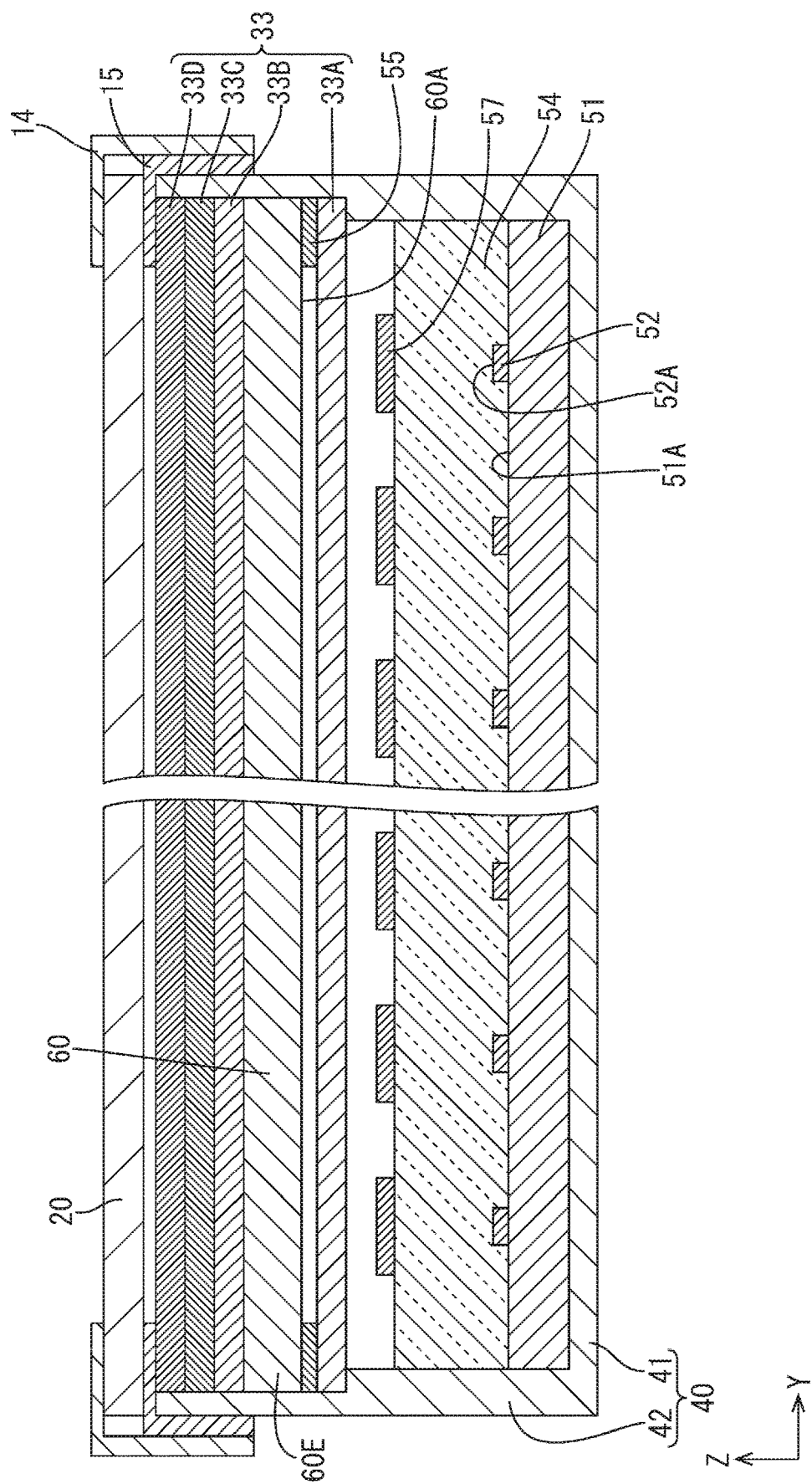
FIG. 15 is a cross-sectional view of a liquid crystal display device according to another embodiment.

(2) The first light reflective portion 55 according to the first embodiment may be formed on other than the LED protection layer 54 between the LED 52 and the wavelength conversion sheet 60. For example, the first light reflective portion 55 may be formed on a plate surface of the dichroic sheet 33A on an LED protection layer 54 side as illustrated in FIG. 14, and may be formed on a plate surface 60A of a wavelength conversion sheet 60 on the back side as illustrated in FIG. 15.

Figure 16:
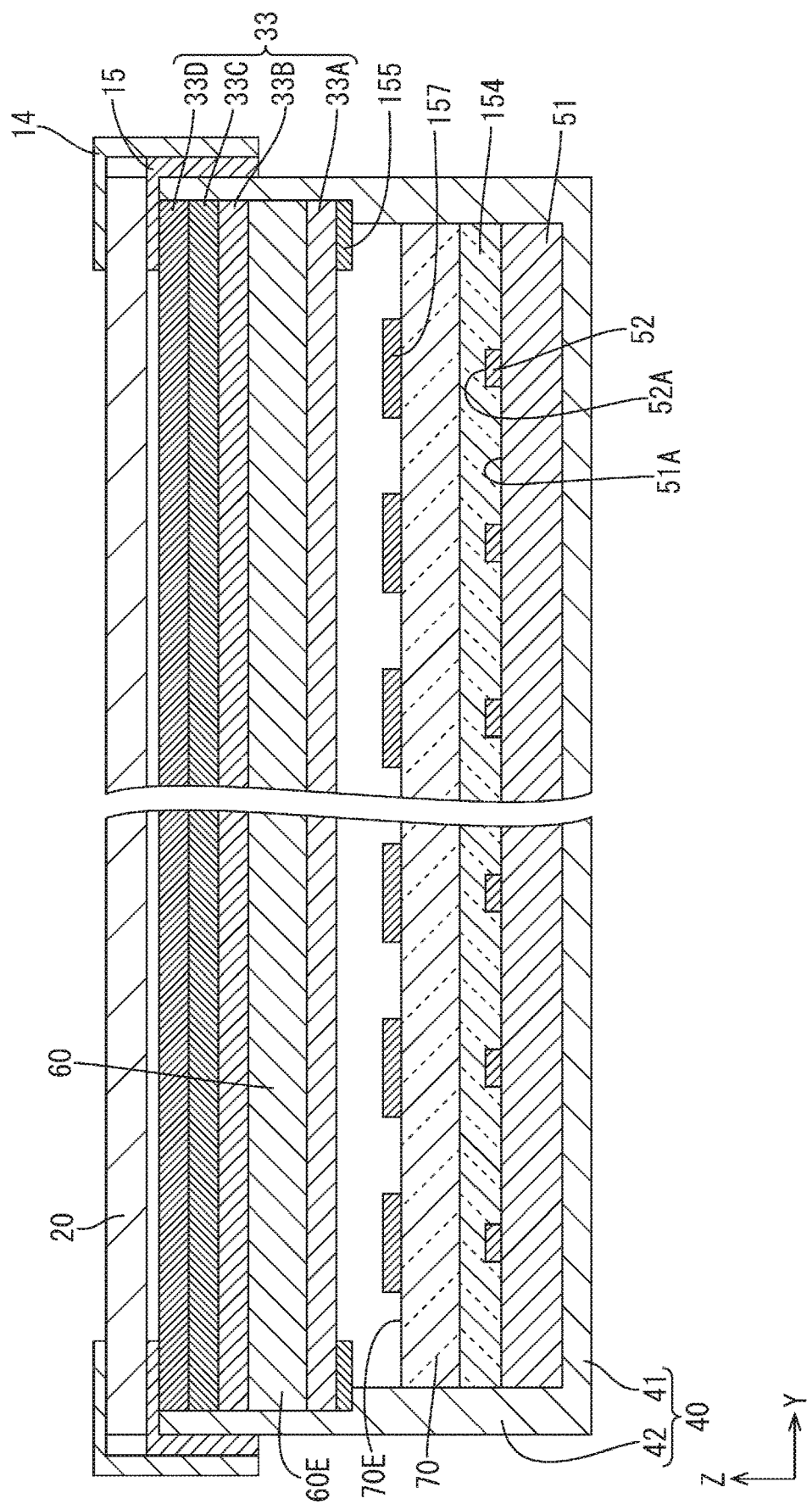
FIG. 16 is a cross-sectional view of a liquid crystal display device according to another embodiment.
Figure 17:
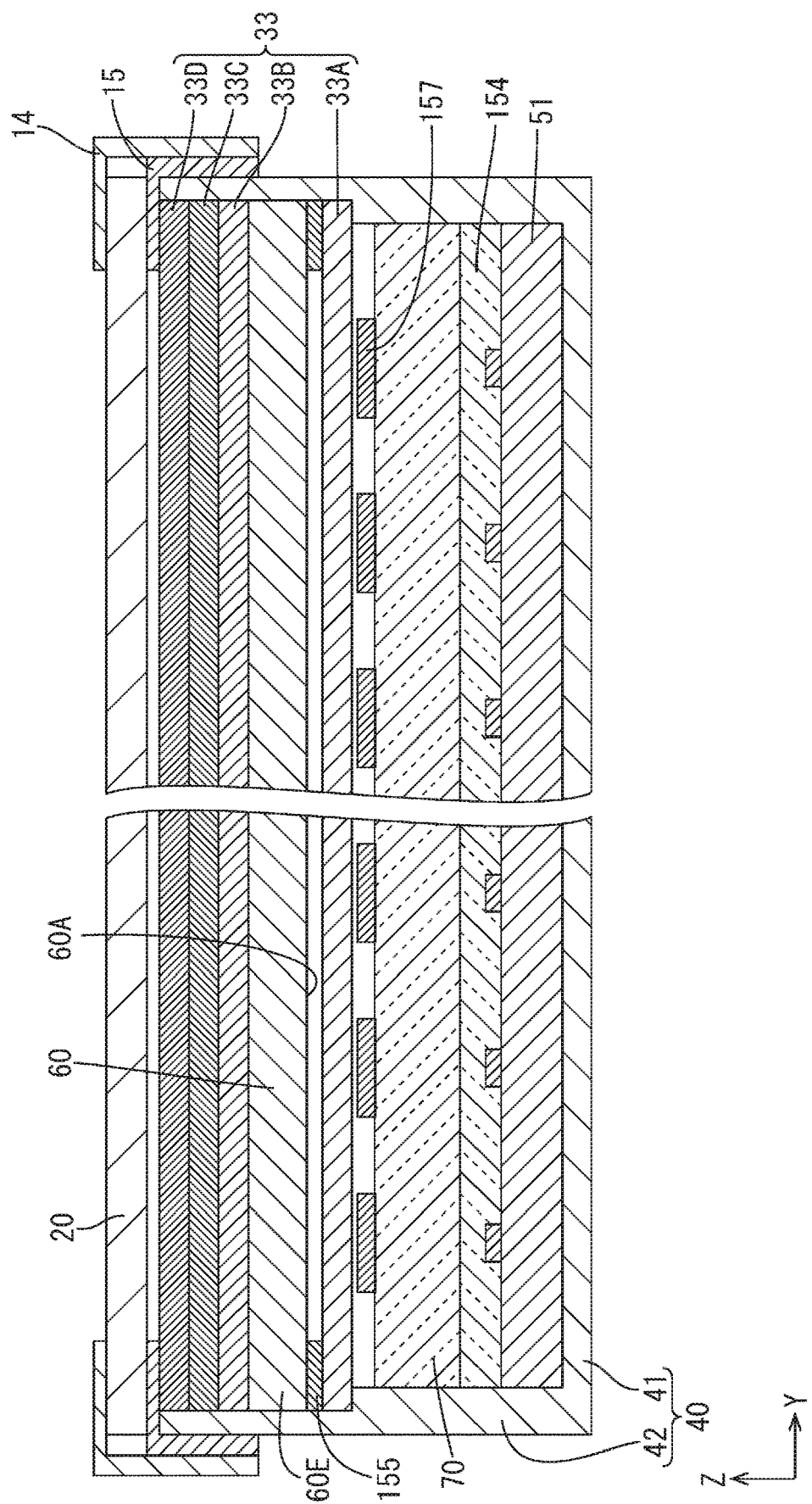
FIG. 17 is a cross-sectional view of a liquid crystal display device according to another embodiment.

(3) The first light reflective portion 155 according to the second embodiment may be formed on other than the light diffuser plate 70 between the LED 52 and the wavelength conversion sheet 60. For example, the first light reflective portion 155 may be formed on a plate surface of a dichroic sheet 33A on a light diffuser plate 70 side as illustrated in FIG. 16, and may be formed on a plate surface 60A of a wavelength conversion sheet 60 on the back side as illustrated in FIG. 17.

Figure 18:
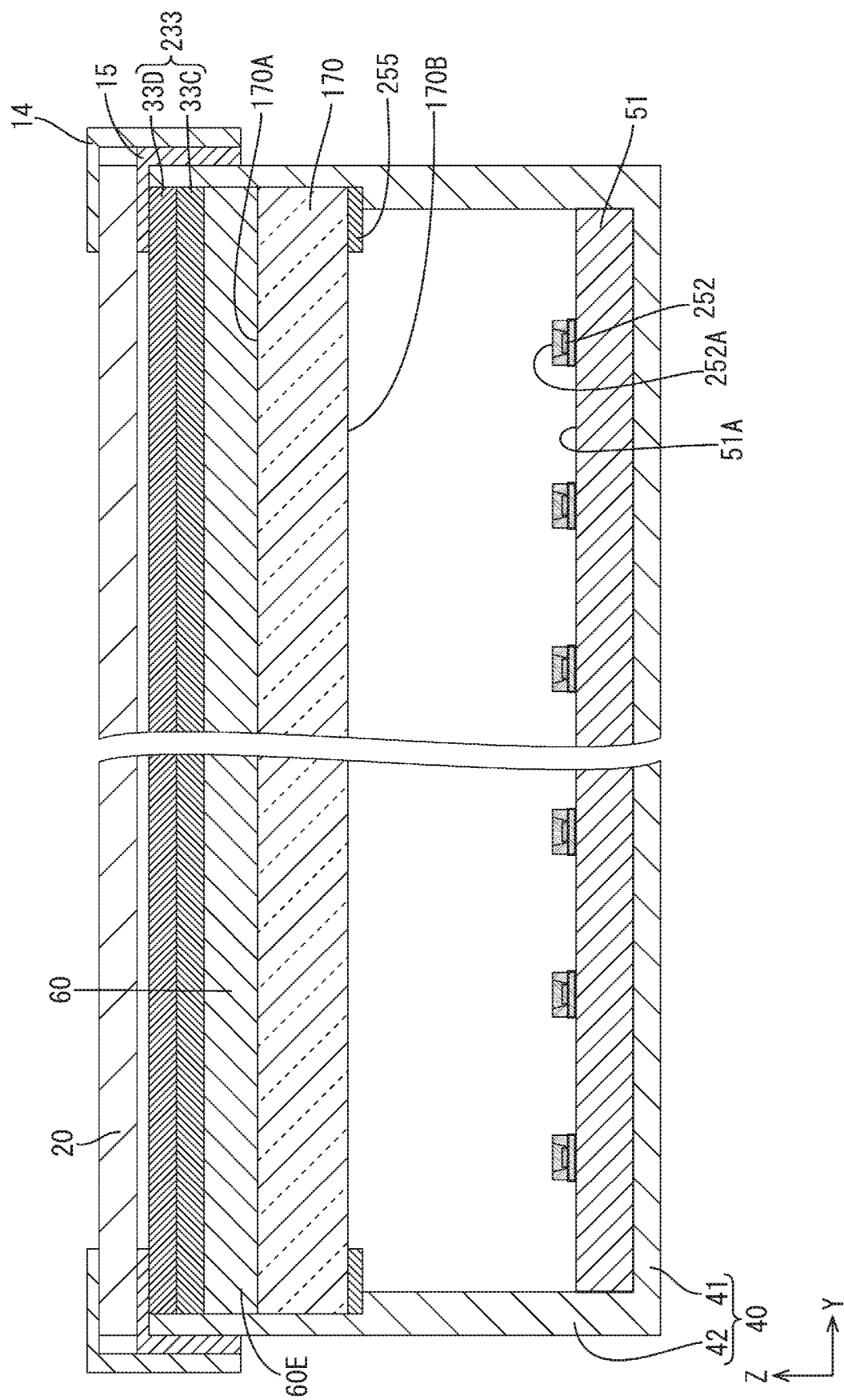
FIG. 18 is a cross-sectional view of a liquid crystal display device according to another embodiment.
Figure 19:
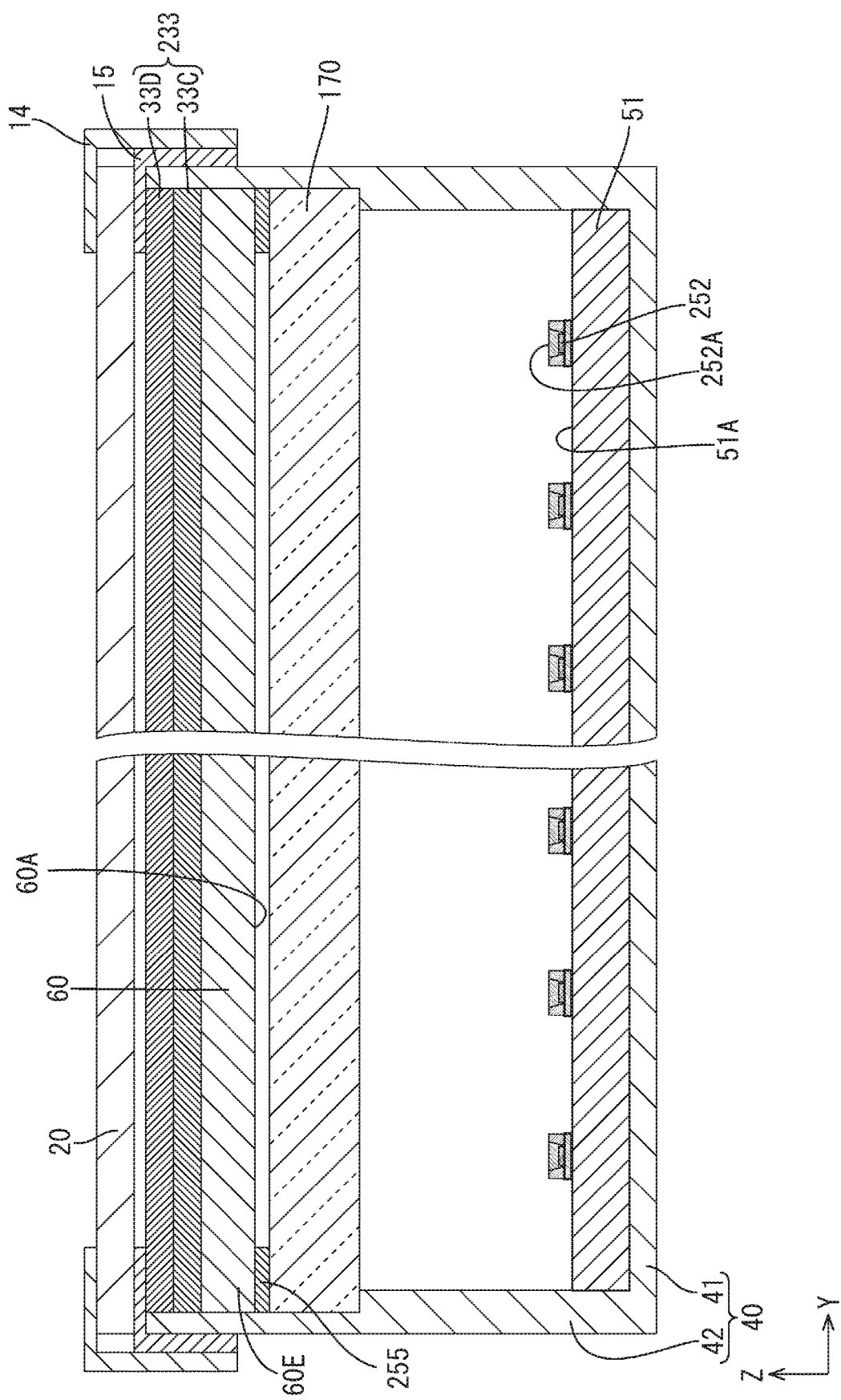
FIG. 19 is a cross-sectional view of a liquid crystal display device according to another embodiment.

(4) The first light reflective portion 255 according to the third embodiment may be formed on other than the plate surface 170A of the light diffuser plate 170 on the wavelength conversion sheet 60 side between the LED 252 and the wavelength conversion sheet 60. For example, the first light reflective portion 255 may be formed on a plate surface 170B of a light diffuser plate 170 on the LED 252 side as illustrated in FIG. 18, and may be formed on a plate surface 60A of a wavelength conversion sheet 60 on the LED 252 side as illustrated in FIG. 19.

Figure 20:
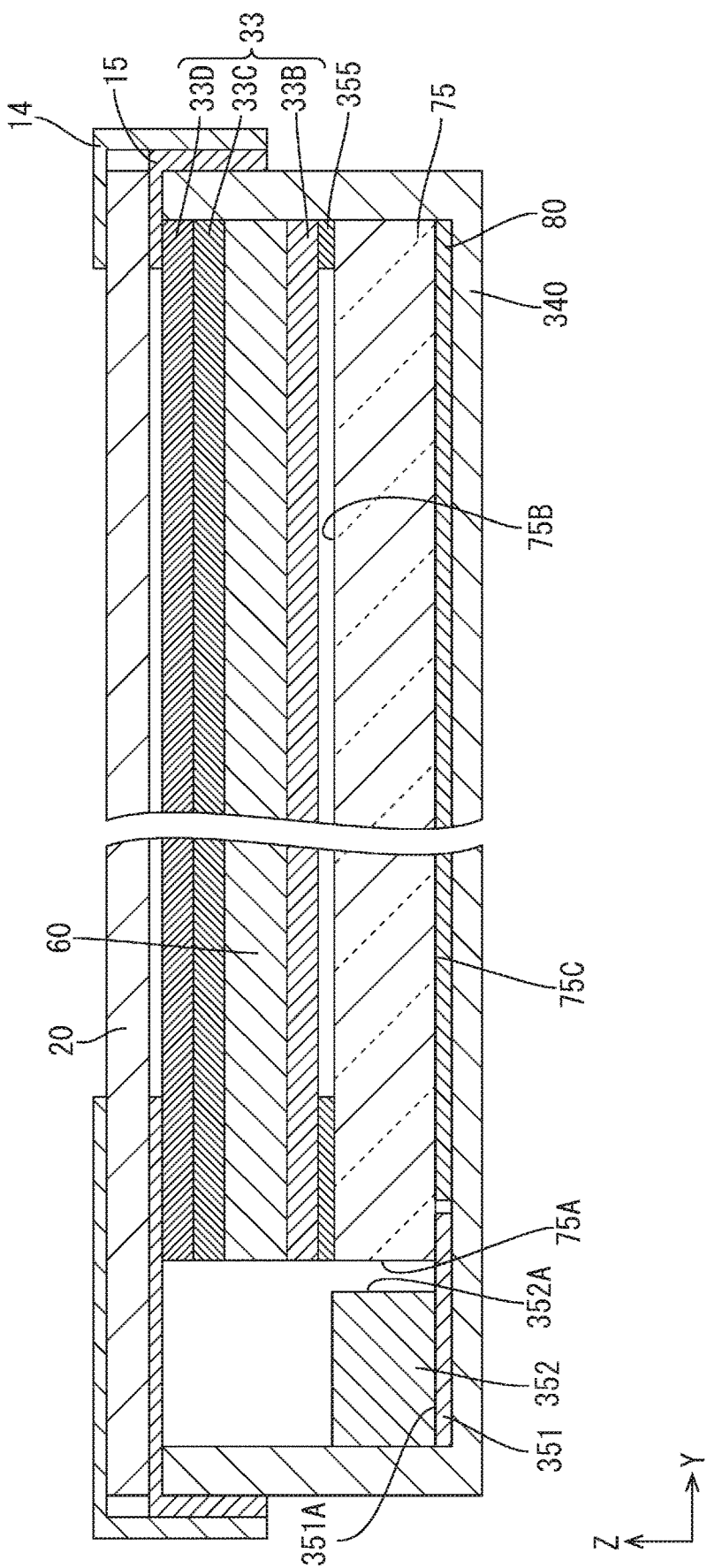
FIG. 20 is a cross-sectional view of a liquid crystal display device according to another embodiment.

(5) The first light reflective portion 355 according to the fourth embodiment may be formed on other than the plate surface 60A of the wavelength conversion sheet 60 on the light guide plate 75 side between the LED 352 and the wavelength conversion sheet 60. For example, as illustrated in FIG. 20, a light diffuser sheet 33B may be disposed between a wavelength conversion sheet 60 and a light guide plate 75, and may be formed on a plate surface of the light diffuser sheet 33B on a light guide plate 75 side.

Figure 21:
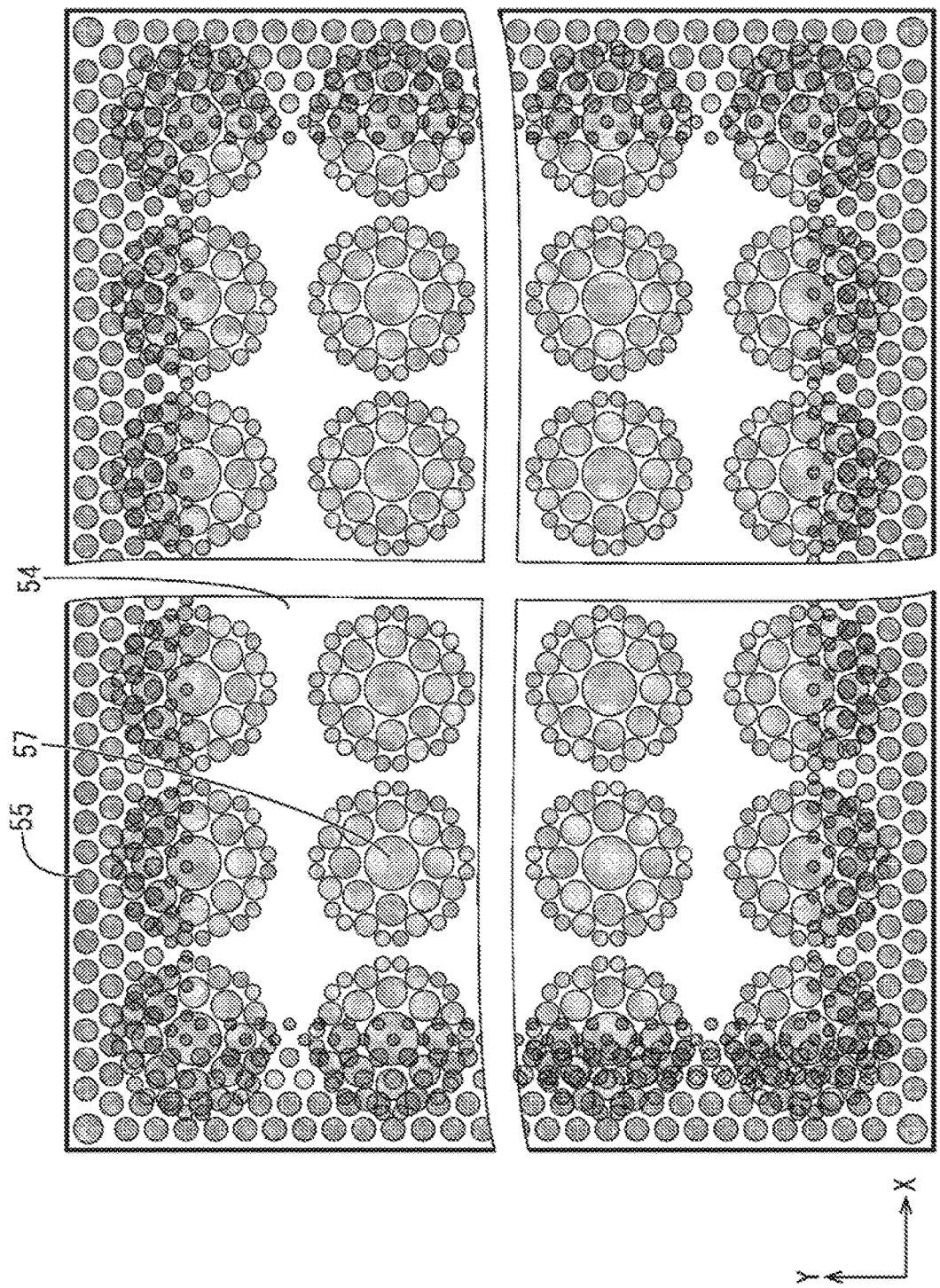
FIG. 21 is a top view of an LED protection layer according to another embodiment.

(6) For example, as illustrated in FIG. 21, first light reflective portions 55 and 155 may be formed so as to include a portion overlapping second reflective portions 57 and 157 in a plan view.

(7) The wavelength region of the emitted primary light of the LEDs 52, 252, and 352 is not limited to the blue light and the magenta light, and may be another color. Further, the wavelength conversion sheet 60 is combined with a member that can emit complementary color light of the primary light according to a wavelength region included in the primary light. For example, when the fluoresce sealing material 53 of the LED 252 includes a green phosphor and the LED 252 emits cyan light, a member that can emit red light can be used for the wavelength conversion sheet 60.

(8) The bezel 14 and the frame 15 may be able to hold at least a part of the liquid crystal panel 20 and the backlight device 30, and may have a non-frame-like shape. Further, both of the bezel 14 and the frame 15 may not be provided, and the liquid crystal panel 20 and the backlight device 30 may be held only by either one of the bezel 14 and the frame 15.

(9) The wavelength conversion sheet 60, various types of the optical sheets 33, and the light diffuser plate 170 may be supported by another member instead of the sidewall 42 of the chassis 40.

(10) The liquid crystal panel 20, the backlight devices 30, 130, 230, and 330, and the liquid crystal display devices 10, 110, 210, and 310 may have a non-rectangular shape.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An illumination device comprising:
a plurality of light sources;
a wavelength conversion sheet configured to perform wavelength conversion on light from the plurality of light sources; and
a first light reduction portion disposed in a frame shape as a whole overlapping an outer peripheral portion of the wavelength conversion sheet and not overlapping the plurality of light sources in a plan view between the plurality of light sources and the wavelength conversion sheet, the first light reduction portion being a light reflective portion configured to reduce a light amount by reflecting incident light,
wherein the first light reduction portion has a planar shape in which a pattern forming the frame shape is provided in a plurality of rows in a concentric annular shape, and
an area of the pattern increases from an inner side to an outer side in the concentric annular shape.

2. The illumination device according to claim 1, wherein the first light reduction portion is formed of a resin having light reflectivity.

3. The illumination device according to claim 1, wherein the first light reduction portion is formed of a white resin in which particles having light reflectivity are dispersed and blended in the white resin having an ultraviolet curing property or a thermosetting property.

4. The illumination device according to claim 1, wherein the first light reduction portion is provided on a plate surface on a light source side of plate surfaces of the wavelength conversion sheet.

5. A display device comprising:
the illumination device according to claim 1; and
a display panel configured to perform display by using light from the illumination device.

6. The display device according to claim 5, wherein the display panel is a liquid crystal panel including a liquid crystal layer.

7. An illumination device comprising:
a plurality of light sources;
a wavelength conversion sheet configured to perform wavelength conversion on light from the plurality of light sources; and
a first light reduction portion disposed in a frame shape as a whole overlapping an outer peripheral portion of the wavelength conversion sheet and not overlapping the plurality of light sources in a plan view between the plurality of light sources and the wavelength conversion sheet, the first light reduction portion being a light reflective portion configured to reduce a light amount by reflecting incident light; and
an optical member in a plate shape disposed between the plurality of light sources and the wavelength conversion sheet, and configured to provide a predetermined optical action,
wherein the first light reduction portion is provided on a plate surface of the optical member.

8. The illumination device according to claim 7, wherein the first light reduction portion is formed of a resin having light reflectivity.

9. The illumination device according to claim 7, wherein the first light reduction portion is formed of a white resin in which particles having light reflectivity are dispersed and blended in the white resin having an ultraviolet curing property or a thermosetting property.

10. A display device comprising:
the illumination device according to claim 7; and
a display panel configured to perform display by using light from the illumination device.

11. The display device according to claim 10, wherein the display panel is a liquid crystal panel including a liquid crystal layer.

12. An illumination device comprising:
a plurality of light sources;
a wavelength conversion sheet configured to perform wavelength conversion on light from the plurality of light sources; and
a first light reduction portion disposed in a frame shape as a whole overlapping an outer peripheral portion of the wavelength conversion sheet and not overlapping the plurality of light sources in a plan view between the plurality of light sources and the wavelength conversion sheet, the first light reduction portion being a light reflective portion configured to reduce a light amount by reflecting incident light, wherein the plurality of the light sources are arranged in a planar form,
the wavelength conversion sheet is disposed in a direction in which a plate surface of the wavelength conversion sheet is located along a light-emitting face of each of the plurality of light sources, and
the first light reduction portion is disposed between the plate surface of the wavelength conversion sheet on a light-emitting face side and the light-emitting face.

13. The illumination device according to claim 12, further comprising:
a light source substrate on which the plurality of light sources are mounted; and
a light source protection layer configured to protect the plurality of light sources, the light source protection layer being provided on a mounting surface of the light source substrate, covering the plurality of light sources, and having transparency,
wherein the first light reduction portion is provided on the light source protection layer.

14. The illumination device according to claim 12, further comprising:
a second light reduction portion disposed in a planar form as a whole overlapping each of the plurality of light sources in a plan view, and configured to reduce the light amount by reflecting incident light.

15. The illumination device according to claim 14,
wherein the first light reduction portion includes a portion overlapping the second light reduction portion in a plan view.

16. The illumination device according to claim 14,
wherein the second light reduction portion is a light reflective portion formed of a resin having light reflectivity.

17. The illumination device according to claim 14, further comprising:
a light source substrate including a mounting surface on which the plurality of light sources are mounted; and
a light source protection layer disposed on the mounting surface, covering the plurality of light sources, and configured to protect the plurality of light sources,
wherein the first light reduction portion and the second light reduction portion are provided on the light source protection layer.

18. The illumination device according to claim 12, further comprising:
a light source substrate including a mounting surface on which the plurality of light sources are mounted,
wherein the mounting surface is divided into a plurality of dimming regions, each of the plurality of dimming regions accommodate at least one of the plurality of light sources, and
the plurality of light sources are configured to control light emission intensity for each of the dimming regions.

19. A display device comprising:
the illumination device according to claim 9; and
a display panel configured to perform display by using light from the illumination device.

20. The display device according to claim 19,
wherein the display panel is a liquid crystal panel including a liquid crystal layer.

* * * * *